United States Patent
Nozue et al.

(10) Patent No.: US 8,841,396 B2
(45) Date of Patent: Sep. 23, 2014

(54) ETHYLENE-α-OLEFIN COPOLYMER AND MOLDED ARTICLE

(75) Inventors: Yoshinobu Nozue, Ichihara (JP); Naoko Ochi, Chiba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 13/581,326

(22) PCT Filed: Mar. 10, 2011

(86) PCT No.: PCT/JP2011/056320
§ 371 (c)(1),
(2), (4) Date: Aug. 27, 2012

(87) PCT Pub. No.: WO2011/115192
PCT Pub. Date: Sep. 22, 2011

(65) Prior Publication Data
US 2013/0005930 A1     Jan. 3, 2013

(30) Foreign Application Priority Data
Mar. 15, 2010   (JP) ................................. 2010-057478

(51) Int. Cl.
*C08F 210/02*     (2006.01)

(52) U.S. Cl.
USPC ........................................................ 526/348

(58) Field of Classification Search
USPC ........................................................ 526/348
See application file for complete search history.

(56) References Cited

U.S. PATENT DOCUMENTS

| | | | |
|---|---|---|---|
| 7,335,715 | B2 | 2/2008 | Iseki et al. |
| 8,436,101 | B2 * | 5/2013 | Nozue et al. .................. 525/240 |
| 2003/0060579 | A1 | 3/2003 | Oshima et al. |
| 2003/0120003 | A1 | 6/2003 | Kashiwa et al. |
| 2005/0192417 | A1 | 9/2005 | Iseki et al. |
| 2006/0199925 | A1 | 9/2006 | Matsuura et al. |
| 2008/0090983 | A1 | 4/2008 | Satoh et al. |
| 2009/0137755 | A1 | 5/2009 | Yamada et al. |
| 2010/0305292 | A1 * | 12/2010 | Nozue et al. ................ 526/348.5 |
| 2010/0310799 | A1 | 12/2010 | Nozue et al. |
| 2011/0040059 | A1 | 2/2011 | Nozue et al. |
| 2012/0065346 | A1 * | 3/2012 | Nozue et al. .................. 526/119 |

FOREIGN PATENT DOCUMENTS

| | | | |
|---|---|---|---|
| CN | 1392881 A | 1/2003 | |
| CN | 101341176 A | 1/2009 | |
| EP | 0339571 A1 | 11/1989 | |
| JP | 01-292009 A | 11/1989 | |
| JP | 07-276495 A | 10/1995 | |
| JP | 2002-105132 A | 4/2002 | |
| JP | 2003-096124 A | 4/2003 | |
| JP | 2003-096125 A | 4/2003 | |
| JP | 2004-149761 A | 5/2004 | |
| JP | 2005-002333 A | 1/2005 | |
| JP | 2005-206777 A | 8/2005 | |
| JP | 2005-248013 A | 9/2005 | |
| JP | 2005-271420 A | 10/2005 | |
| JP | 2006-233206 A | 9/2006 | |
| JP | 2006-233208 A | 9/2006 | |
| JP | 2006-307138 A | 11/2006 | |
| JP | 2006-321991 A | 11/2006 | |
| JP | 2007-169339 A | 7/2007 | |
| JP | 2007-177168 A | 7/2007 | |
| JP | 2009-040894 A | 2/2009 | |
| JP | 2009-149871 A | 7/2009 | |
| JP | 2009-149872 A | 7/2009 | |
| JP | 2009-149873 A | 7/2009 | |
| JP | 2011-006674 A | 1/2011 | |
| JP | 2011-6676 A * | 1/2011 | ............ C08F 210/02 |
| WO | 2007077732 A1 | 7/2007 | |
| WO | WO 2009/069825 A1 * | 6/2009 | ............ C08F 210/16 |
| WO | WO 2010/137734 A1 * | 2/2010 | ............ C08F 210/16 |

OTHER PUBLICATIONS

Int'l Search Report issued Jun. 21, 2011 in Int'l Application No. PCT/JP2011/056320.
Office Action issued Oct. 11, 2013 in CN Application No. 201180013772.3.
Office Action issued Jul. 08, 2014 in JP Application No. 2011-055276.

* cited by examiner

*Primary Examiner* — Rip A. Lee
(74) *Attorney, Agent, or Firm* — Panitch Schwarze Belisario & Nadel LLP

(57) ABSTRACT

An ethylene-α-olefin copolymer, wherein the ethylene-α-olefin copolymer has a density of 860 to 950 kg/m³ and a melt flow rate of 0.01 to 100 g/10 min, wherein in a molecular weight curve measured by gel permeation chromatography, the molecular weight of the copolymer providing the highest peak exists within the range of 10,000 to 20,000, wherein the height of the peak at a molecular weight of 177,000 is 5 to 30% where the height of the highest peak is 100%, wherein a characteristic relaxation time of the copolymer satisfies a relation represented by formula (1), and wherein the ethylene-α-olefin copolymer exhibits more than one melt peak observed by a differential scanning calorimeter.

$$40.2 \times MFR^{-0.606} < \tau < 71.8 \times MFR^{-0.175} \qquad (1)$$

4 Claims, No Drawings

ETHYLENE-α-OLEFIN COPOLYMER AND MOLDED ARTICLE

CROSS-REFERENCE TO RELATED APPLICATION

This application is a Section 371 of International Application No. PCT/JP2011/056320, filed Mar. 10, 2011, which was published in the Japanese language on Sep. 22, 2011, under International Publication No. WO 2011/115192 A1, and the disclosure of which is incorporated herein by reference.

TECHNICAL FIELD

The present invention relates to ethylene-α-olefin copolymers and articles obtained by extruding the ethylene-α-olefin copolymers.

BACKGROUND ART

Ethylene-α-olefin copolymers have been molded into films, sheets, bottles, and so on by various molding processes and have been used for various applications such as food wrapping materials.

Among ethylene-α-olefin copolymers, copolymers produced by polymerization using metallocene catalysts are known to be superior in mechanical strength such as impact strength and tensile strength. Therefore, since the use of such copolymers can reduce the thickness of articles formed from ethylene-α-olefin copolymers produced by polymerization using catalysts other than metallocene catalysts while maintaining the mechanical strength thereof, reduction in the weight or the cost of articles can be expected; therefore, the use of such copolymers for various applications is being studied. However, since ethylene-α-olefin copolymers produced by polymerization using conventional metallocene catalysts are high in extrusion load in extrusion processing and low in melt tension, improvement in molding processability thereof has been desired. Moreover, ethylene-α-olefin copolymers obtained by using metallocene catalysts generally are narrow in comonomer composition distribution and is unified in melting temperature of crystals and, therefore, tend to be inferior in secondary processability, e.g., narrow in the range of temperature at which heat-sealing can be achieved.

As a countermeasure thereto, novel metallocene catalysts have recently been studied and ethylene-α-olefin copolymers with improved molding processability produced by polymerization using such catalysts have been proposed. For example, patent literature 1 has disclosed an ethylene-α-olefin copolymer produced by polymerization using a metallocene catalyst composed of a transition metal compound having a ligand in which two groups having a cyclopentadiene type anion skeleton are linked via a bridging group, a transition metal compound having two groups having a substituted cyclopentadiene type anion skeleton, the two groups not being linked to each other, and an activating promoter component. Patent literature 2 has disclosed an ethylene-α-olefin copolymer produced by polymerization using a promoter component prepared by bringing silica, hexamethyldisilazane, diethylzinc, pentafluorophenol, and water into contact with each other, and a metallocene catalyst composed of triisobutylaluminum and racemic ethylenebis(1-indenyl) zirconium diphenoxide. Patent literature 3 has disclosed an ethylene-α-olefin copolymer produced by polymerization using a metallocene catalyst comprising a combination of a transition metal compound having a ligand in which two groups having a cyclopentadiene type anion skeleton are linked via a bridging group and a transition metal compound having a ligand in which a group having a cyclopentadiene type anion skeleton and a group having a fluorenyl type anion skeleton are linked via a bridging group, and a support as a promoter, the support having been prepared by loading methylalumoxane onto porous silica.

Patent Literature 1: JP 2003-96125 A
Patent Literature 2: JP 2004-149761 A
Patent Literature 3: JP 2006-233206 A However, the ethylene-α-olefin copolymers disclosed in patent literatures 1 and 2 have been reduced in extrusion load in molding processing in comparison to ethylene-α-olefin copolymers produced by polymerization using conventional metallocene catalysts, but they are required for further reduction in extrusion load; the ethylene-α-olefin copolymer disclosed in patent literature 3 was not satisfactory in a strain hardening property and take-up property at the time of processing because of insufficient introduction of long chain branches into the main chain.

DISCLOSURE OF THE INVENTION

Under such a situation, the problem to be solved by the present invention is to provide an ethylene-α-olefin copolymer that is low in extrusion load, high in melt tension, superior in take-up property in taking-up a molten copolymer at a fixed tension, superior in strain hardening characteristics, and superior in secondary processability, and an article obtained by extruding the copolymer.

Firstly, the present invention relates to an ethylene-α-olefin copolymer comprising monomer units derived from ethylene and monomer units derived from an α-olefin having 3 to 20 carbon atoms, wherein the ethylene-α-olefin copolymer has a density (d) of 860 to 950 kg/m³ and a melt flow rate (MFR) of 0.01 to 100 g/10 min, wherein in a molecular weight curve measured by gel permeation chromatography (GPC), the molecular weight of the copolymer providing the highest peak exists within the range of 10,000 to 20,000, wherein the height of the peak at a molecular weight of 177,000 is 5 to 30% where the height of the highest peak is 100%, wherein the characteristic relaxation time (τ) of the copolymer satisfies a relation represented by formula (1), and wherein the ethylene-α-olefin copolymer exhibits more than one melt peak observed by a differential scanning calorimeter (DSC).

$$40.2 \times MFR^{-0.606} < \tau < 71.8 \times MFR^{-0.175} \tag{1}$$

Secondly, the present invention relates to an ethylene-α-olefin copolymer comprising monomer units derived from ethylene and monomer units derived from an α-olefin having 3 to 20 carbon atoms, wherein the ethylene-α-olefin copolymer has a density (d) of 860 to 950 kg/m³ and a melt flow rate (MFR) of 0.01 to 100 g/10 min, wherein in a molecular weight curve measured by gel permeation chromatography (GPC), the molecular weight of the copolymer providing the highest peak exists within the range of 10,000 to 20,000, wherein the height of the peak at a molecular weight of 177,000 is 5 to 30% where the height of the highest peak is 100%, wherein the number ($N_{LCB}$) of branches having 5 or more carbon atoms measured by NMR is 0.1 or more, and wherein the ethylene-α-olefin copolymer exhibits more than one melt peak observed by a differential scanning calorimeter (DSC).

Thirdly, the present invention relates to articles obtained by extruding the above-mentioned ethylene-α-olefin copolymers.

MODE FOR CARRYING OUT THE INVENTION

A first embodiment of the present invention is an ethylene-α-olefin copolymer comprising monomer units derived from ethylene and monomer units derived from an α-olefin having 3 to 20 carbon atoms, wherein the ethylene-α-olefin copolymer has a density (d) of 860 to 950 kg/m³ and a melt flow rate (MFR) of 0.01 to 100 g/10 min, wherein in a molecular weight curve measured by gel permeation chromatography (GPC), the molecular weight of the copolymer providing the highest peak exists within the range of 10,000 to 20,000, wherein the height of the peak at a molecular weight of 177,000 is 5 to 30% where the height of the highest peak is 100%, wherein the characteristic relaxation time (τ) of the copolymer satisfies a relation represented by formula (1), and wherein the ethylene-α-olefin copolymer exhibits more than one melt peak observed by a differential scanning calorimeter (DSC).

$$40.2 \times MFR^{-0.606} < \tau < 71.8 \times MFR^{-0.175} \quad (1)$$

A second embodiment of the present invention is an ethylene-α-olefin copolymer comprising monomer units derived from ethylene and monomer units derived from an α-olefin having 3 to 20 carbon atoms, wherein the ethylene-α-olefin copolymer has a density (d) of 860 to 950 kg/m³ and a melt flow rate (MFR) of 0.01 to 100 g/10 min, wherein in a molecular weight curve measured by gel permeation chromatography (GPC), the molecular weight of the copolymer providing the highest peak exists within the range of 10,000 to 20,000, wherein the height of the peak at a molecular weight of 177,000 is 5 to 30% where the height of the highest peak is 100%, wherein the number ($N_{LCB}$) of branches having 5 or more carbon atoms measured by NMR is 0.1 or more, and wherein the ethylene-α-olefin copolymer exhibits more than one melt peak observed by a differential scanning calorimeter (DSC).

First, the factors common to the first and second embodiments are described in detail.

The ethylene-α-olefin copolymer of the present invention is an ethylene-α-olefin copolymer comprising monomer units derived from ethylene and monomer units derived from an α-olefin having 3 to 20 carbon atoms. Examples of the α-olefin include propylene, 1-butene, 1-pentene, 1-hexene, 1-heptene, 1-octene, 1-nonene, 1-decene, 1-dodecene, 4-methyl-1-pentene, and 4-methyl-1-hexene, and these may be used alone or two or more members thereof may be used together. As the α-olefin, preferred are 1-butene, 1-hexene, 4-methyl-1-pentene, and 1-octene, and more preferred are 1-hexene, 4-methyl-1-pentene, and 1-octene.

The ethylene-α-olefin copolymer of the present invention may comprise monomer units derived from other monomers in addition to the monomer units derived from ethylene and the monomer units derived from the α-olefin having from 3 to 20 carbon atoms as far as the effect of the present invention is not impaired. Examples of such other monomers include conjugated dienes (e.g., butadiene and isoprene), non-conjugated dienes (e.g., 1,4-pentadiene), acrylic acid, acrylic acid esters (e.g., methyl acrylate and ethyl acrylate), methacrylic acid, methacrylic acid esters (e.g., methyl methacrylate and ethyl methacrylate), and vinyl acetate.

The content of the monomer units derived from ethylene in the ethylene-α-olefin copolymer of the present invention is usually 50% by weight to 99.5% by weight in the overall weight (100% by weight) of the ethylene-α-olefin copolymer. The content of the monomer units derived from an α-olefin is usually 0.5 to 50% by weight in the overall weight (100% by weight) of the ethylene-α-olefin copolymer.

The ethylene-α-olefin copolymer of the present invention is preferably a copolymer comprising monomer units derived from ethylene and monomer units derived from an α-olefin having 4 to 20 carbon atoms, more preferably a copolymer comprising monomer units derived from ethylene and monomer units derived from an α-olefin having 5 to 20 carbon atoms, and even more preferably a copolymer comprising monomer units derived from ethylene and monomer units derived from an α-olefin having 6 to 8 carbon atoms.

Examples of the ethylene-α-olefin copolymer of the present invention include ethylene-1-butene copolymers, ethylene-1-hexene copolymers, ethylene-4-methyl-1-pentene copolymers, ethylene-1-octene copolymers, ethylene-1-butene-1-hexene copolymers ethylene-1-butene-4-methyl-1-pentene copolymers, ethylene-1-butene-1-octene copolymers, and ethylene-1-hexene-1-octene copolymers; ethylene-1-hexene copolymers, ethylene-4-methyl-1-pentene copolymers, ethylene-1-butene-1-hexene copolymers, ethylene-1-butene-1-octene copolymers, and ethylene-1-hexene-1-octene copolymers are preferred.

The density (hereinafter may be indicated as "d") of the ethylene-α-olefin copolymer of the present invention is 860 to 950 kg/m³. From the viewpoint of increasing the mechanical strength of an article to be obtained, it is preferably not more than 940 kg/m³, more preferably not more than 935 kg/m³. From the viewpoint of increasing the rigidity of an article to be obtained, it is preferably not less than 870 kg/m³, more preferably not less than 880 kg/m³, even more preferably not less than 890 kg/m³, and particularly preferably not less than 900 kg/m³. The density is measured in accordance with Method A provided in JIS K7112-1980 after doing the annealing disclosed in JIS K6760-1995. The density of an ethylene-α-olefin copolymer can be changed by the content of the monomer units derived from ethylene in the ethylene-α-olefin copolymer.

The melt flow rate (hereinafter sometimes described as "MFR") of the ethylene-α-olefin copolymer of the present invention is usually 0.01 to 100 g/10 min. From the viewpoint of reducing extrusion load in molding processing, the melt flow rate is preferably 0.1 g/10 min or more. From the viewpoint of increasing the mechanical strength of an article to be obtained, it is preferably 50 g/10 min or less, more preferably 30 g/10 min or less, and even more preferably 15 g/10 min or less. The melt flow rate is a value measured by Method A under conditions represented by a temperature of 190° C. and a load of 21.18 N in the method provided in JIS K7210-1995. The melt flow rate of the ethylene-α-olefin copolymer can be changed, for example, by a hydrogen concentration or a polymerization temperature in the production method described later, and as a hydrogen concentration or a polymerization temperature is raised, the melt flow rate of the ethylene-α-olefin is increased.

The ethylene-α-olefin copolymer of the present invention exhibits a molecular weight distribution with broad distribution on the higher molecular weight side; in its molecular weight distribution curve measured by gel permeation chromatography (GPC), the molecular weight of the copolymer providing the highest peak exists within the range of 10,000 to 20,000 and the height (H) of the peak at a molecular weight of 177,000 is 5% to 30%, preferably 10% to 25% where the height of the highest peak is 100%. The ethylene-α-olefin copolymer of the present invention, which satisfies such a requirement, is low in extrusion load and superior in strain hardening characteristics. If the molecular weight at the highest peak position is excessively high, extrusion load will become high. If the height (H) of the GPC curve at the position of a molecular weight of 177,000 when the molecular weight of the ethylene-α-olefin copolymer at its highest peak position is within the range of 10,000 to 20,000, there are less high molecular weight components and sufficient strain hardening characteristics are not developed.

The ethylene-α-olefin copolymer of the present invention is a copolymer that exhibits more than one melting peak within the range of from 25° C. to a melting completion temperature, the peaks existing on a melting curve obtained from differential scanning calorimetry measurement of the ethylene-α-olefin copolymer. The presence of more than one melting peaks indicates many melting peaks different than the maximum melting peak (the melting peak having the greatest peak height), and it means that the compositional distribution of the ethylene-α-olefin copolymer (the distribution of the proportions of contained monomer units among the respective polymer components contained in the ethylene-α-olefin copolymer) is broad. The number of the melting peaks which the ethylene-α-olefin copolymer of the present invention has is usually 2 to 5, preferably 2 to 3. A copolymer having many melting peaks is superior in secondary processability, e.g., broader in temperature range where heat sealing can be achieved successfully, in comparison between copolymers with the same density.

The melting curve of an ethylene-α-olefin copolymer is obtained from a differential scanning calorimetry curve obtained, for example, by (1) retaining an aluminum pan, in which about 10 mg of a sample is sealed, at 150° C. for 5 minutes, (2) reducing its temperature from 150° C. to 20° C. at 5° C./min, (3) retaining it at 20° C. for 2 minutes, (4) raising its temperature from 20° C. to (the melting completion temperature+about 20° C.) (usually, around 150° C.), by using a differential scanning calorimeter (e.g., a differential scanning calorimeter Model DSC-7, manufactured by Perkin Elmer), and then performing measurement during (4).

The ratio (hereinafter, sometimes described as "Mw/Mn") of the weight average molecular weight (hereinafter, sometimes described as "Mw") to the number average molecular weight (hereinafter, sometimes described as "Mn") of the ethylene-α-olefin copolymer of the present invention is preferably from 4 to 30, and the ratio (hereinafter, sometimes described as "Mz/Mw") of the Z average molecular weight (hereinafter, sometimes described as "Mz") to the weight average molecular weight (Mw) is preferably from 5 to 15. If Mw/Mn is excessively small, extrusion load in molding processing may become high. Mw/Mn is more preferably 4.5 or more, even more preferably 5.5 or more, and particularly preferably 6 or more. If Mw/Mn is excessively large or Mz/Mw is excessively large, the mechanical strength of articles to be obtained may become low. Mw/Mn is preferably 25 or less, more preferably 20 or less, and even more preferably 18 or less. The Mw/Mn and the Mz/Mw are determined by measuring a number average molecular weight (Mn), a weight average molecular weight (Mw), and a Z average molecular weight (Mz) by GPC, and then dividing Mw by Mn and dividing Mz by Mw. The Mw/Mn can be changed, for example, by a hydrogen concentration in the production method described later, and if a hydrogen concentration is increased, then the Mw/Mn of the ethylene-α-olefin copolymer becomes smaller. The Mz/Mw can be changed, for examples, by the use proportions of the transition metal compound (B1) and the transition metal compound (B2) in the production method described later.

The swell ratio (hereinafter sometimes indicated as "SR") of the ethylene-α-olefin copolymer of the present invention is preferably 1.8 or more in order to suppress the occurrence of neck-in in producing a film by extruding the copolymer using a flat die. From the viewpoint of improving the take-up property in extrusion process, the SR is preferably 3.2 or less, and more preferably 3.0 or less. The swell ratio is a value (D/D$_0$) obtained by cooling in air a strand of an ethylene-α-olefin copolymer extruded in a length of around 15 to 20 mm through an orifice under conditions including a temperature of 190° C. and a load of 21.18 N during the measurement of a melt flow rate (MFR), measuring the diameter D (unit: mm) of the strand at a position of about 5 mm from the tip on the extrusion upstream side, and dividing the diameter D by the orifice diameter 2.095 mm (D$_0$). The swell ratio can be changed, for example, by a hydrogen concentration, an ethylene pressure, or an electron donating compound concentration in the polymerization in the production method described later, and if the hydrogen concentration is increased or the ethylene pressure is reduced, then the swell ratio of the ethylene-α-olefin copolymer becomes larger. The swell ratio can also be controlled, for example, by implementing prepolymerization during the polymerization.

The elongational viscosity nonlinear index k indicating the degree of the strain hardening of the ethylene-α-olefin copolymer of the present invention is preferably larger than 0.4, more preferably larger than 0.7, even more preferably larger than 0.9, and most preferably larger than 1.1. When k is small, sufficient strain hardening is not exhibited, which may cause inconvenience in various type of molding processing.

The elongational viscosity nonlinear index k is a value calculated as a slope of ln α(t) between t=1.5 seconds and t=2.5 seconds for a curve:

$$\alpha(t)=\sigma_1(t)/\sigma_{0.1}(t) \tag{6}$$

obtained by dividing a viscosity-time curve σ$_1$(t) of a melted resin that is elongated at a temperature of 130° C. and a Hencky rate of 1 s$^{-1}$ by a viscosity-time curve σ$_1$(t) of the melted resin that is elongated at a temperature of 130° C. and a Hencky rate of 0.1 s$^{-1}$.

The measurement of a viscosity-time curve σ(t) of a melted resin is performed using a viscoelasticity analyzer (e.g., ARES manufactured by TA Instruments). The measurement is performed under a nitrogen atmosphere.

It is preferred for the ethylene-α-olefin copolymer of the present invention that the elongational viscosity nonlinear index ratio k1/k2, which is the ratio of the degree of strain hardening in a high strain region to the degree of strain hardening in a low strain region, is within the range of 0.8 to 1.1.

Herein, k1 is a slope of ln α(t) between times t=2.0 seconds and t=2.5 seconds, and k2 is a slope of ln α(t) between times t=1.5 seconds and t=2.0 seconds. That is, the elongational viscosity nonlinear index ratio k1/k2 becomes a large value if sufficient strain hardening is exhibited even in a high strain region and it becomes a small value if strain hardening is insufficient in a high strain region. Although conventional ethylene-α-olefin copolymers have exhibited insufficient strain hardening in a high strain region, the ethylene-α-olefin copolymer of the present invention maintains a high strain hardening property in a high strain region. The value of k1/k2 of the polymer of the present invention is more preferably within the range of 0.9 to 1.1. The k1/k2 can be controlled by adjusting the molecular weight, for example, by adjusting hydrogen concentration; when the value of k1/i2 is small, it is possible to increase the k1/k2 by reducing the molecular weight within an appropriate range by increasing hydrogen concentration.

In a first embodiment of the present invention, the characteristic relaxation time (hereinafter, sometimes represented by "τ") of the ethylene-α-olefin copolymer of the present invention satisfies the following relation represented by formula (1):

$$40.2\times MFR^{-0.606}<\tau<71.8\times MFR^{-0.175} \tag{formula (1)}$$

preferably satisfies the relation represented by formula (1'), and even more preferably satisfies the relation of formula (1)".

$$45.9 \times MFR^{-0.606} < \tau < 66.3 \times MFR^{-0.175} \quad \text{formula (1)'}$$

$$51.7 \times MFR^{-0.606} < \tau < 60.8 \times MFR^{-0.175} \quad \text{formula (1)"}$$

Generally, it is known that a polymer having sufficient entanglement satisfies the following formula:

$$\tau = G \cdot \eta_0 \quad \text{formula (2)}$$

Moreover, in FIG. 14 of the paper of P. M. Wood-Adams, et al. (Macromolecules, 33, 7489 (2000)), it has been reported that the log-log plot of $\eta_0$ versus Mw of a metallocene polyethylene having long chain branches can be expressed by a straight line. This strongly suggests that the following formula is true for a polyethylene having long chain branches:

$$\rho_0 = H \cdot Mw^\epsilon \quad \text{formula (3)}$$

By substitute formula (3) into formula (2), the following formula (4) can be derived:

$$\tau = G' \cdot MFR^\epsilon \quad \text{formula (4)}$$

Then, on the basis of the data disclosed in the EXAMPLE section, a plot of $\tau$ versus MFR of the examples with transition metal compound (B1):transition metal compound (B2) =12.5:1 where polymerization conditions other than hydrogen concentration were uniformized was fitted by formula (4) by using spreadsheet software (e.g., Microsoft Excel), then the value of G' determined by the fitting was multiplied by 1.3, (the value of G' was multiplied by 1.2 for (1)', and the value of G' was multiplied by 1.1 for (1)"), and as for $\epsilon$ the result produced by the fitting was used as obtained, thereby the right sides of formulae (1), (1)', and (1)" were obtained. On the other hand, a plot of $\tau$ versus MFR of the examples of the ethylene-α-olefin copolymers produced by polymerization in which transition metal compound (B1):transition metal compound (B2) was varied within the range of from 12.5:1 to 60:1 in the absence of hydrogen, i.e., the ethylene-α-olefin copolymers varying in the ratio of high-molecular weight component to low-molecular weight component was fitted by formula (4) by using spreadsheet software (Microsoft Excel), then the value of G' determined by the fitting was multiplied by 0.7, (the value of G' was multiplied by 0.8 for (1)', and the value of G' was multiplied by 0.9 for (1)"), and as for $\epsilon$ the result produced by the fitting was used as obtained, thereby the left sides of formulae (1), (1)', and (1)" were obtained.

The characteristic relaxation time ($\tau$) is a numerical value relating to the length and the quantity of long chain branches which an ethylene-α-olefin copolymer has; if long chain branches are short (or if the quantity of long chain branches is small), then the value of characteristic relaxation time becomes small, whereas if long chain branches are long (or if the quantity of long chain branches is large), then the value of characteristic relaxation time becomes large. In order to obtain high melt tension and high strain hardening property, long chain branches in a sufficient quantity or with a sufficient length must have been introduced into the molecular chain and it preferably has a certain prolonged relaxation time. Conversely, a polymer having an excessively long relaxation time has a high level of strain hardening property, but it affords a reduced maximum take-up velocity of a molten resin when compared at the same melt tension. The characteristic relaxation time can be altered, for example, by changing polymerization conditions such as a hydrogen concentration and an ethylene pressure, or a use ratio of a transition metal compound (B1) to a transition metal compound (B2), and the characteristic relaxation time of the ethylene-α-olefin copolymer can be lengthened by reducing the use ratio of the transition metal compound (B2).

A characteristic relaxation time is a value calculated from a master curve that is produced in accordance with the principle of temperature-time superposition and indicates the dependence of a melt complex viscosity (unit: Pa·sec) at 190° C. on an angular frequency (unit: rad/sec). Specifically, it is a value by producing a master curve by the superposition of melt complex viscosity-angular frequency curves at temperatures (T, unit: ° C.) of 130° C., 150° C., 170° C., and 190° C. (the unit of melt complex viscosity is Pa·sec and the unit of angular frequency is rad/sec) of an ethylene-α-olefin copolymer onto a melt complex viscosity-angular frequency curve at 190° C. in accordance with the principle of temperature-time superposition, and then approximating the resulting master curve by the following formula (5):

$$\eta = \eta_0 / [1 + (\tau \times \omega)^n] \quad (5)$$

$\eta$: melt complex viscosity (unit: Pa·sec)
$\omega$: angular frequency (unit: rad/sec)
$\tau$: characteristic relaxation time (unit: sec)
$\eta_0$: constant determined for each ethylene-α-olefin copolymer (unit: Pa·sec)
n: constant determined for each ethylene-α-olefin copolymer The calculation may use commercially available calculation software, and examples of the calculation software include Rhios V.4.4.4 produced by Rheometrics.

The measurement of the melt complex viscosity-angular frequency curve is performed using a viscoelasticity measuring apparatus (e.g., Rheometrics Mechanical Spectrometer RMS-800 manufactured by Rheometrics), usually, under the conditions of geometry: parallel plates, a plate diameter: 25 mm, a plate interval: 1.5 to 2 mm, a strain: 5%, and an angular frequency: 0.1 to 100 rad/sec. The measurement is performed under the nitrogen atmosphere, and it is preferable to blend an appropriate amount (e.g., 1000 ppm) of an antioxidant into a measurement sample in advance.

In the second embodiment of the present invention, the number of branches having 5 or more carbon atoms of an ethylene-α-olefin copolymer (hereinafter sometimes described as "$N_{LCB}$"), from the viewpoint of further reduction in extrusion load at molding processing, is preferably 0.1/1000 carbon atoms (hereinafter "1000 carbon atoms" is described as 1000 C) or more, more preferably 0.12/1000 C or more. From the viewpoint of enhancement in mechanical strength of a resulting article, $N_{LCB}$ is preferably 1/1000 C or less, more preferably 0.7/1000 C or less, and even more preferably 0.5/1000 C. The $N_{LCB}$ of an ethylene-α-olefin copolymer can be altered, for example, by the concentration of an electron donating compound or the use ratio of a transition metal compound (B1) to a transition metal compound (B2) in the production method described later. Alternatively, the $N_{LCB}$ can be also controlled by implementing prepolymerization.

$N_{LCB}$ is obtained by determining the area of peaks derived from methine carbon to which a branch having 5 or more carbon atoms is attached, from a $^{13}$C-NMR spectrum measured by a carbon nuclear magnetic resonance ($^{13}$C-NMR) method, taking the sum of the areas of all peaks observed at 5 to 50 ppm as 1000. A peak derived from methine carbon to which a branch having 5 or more carbon atoms is attached is observed at around 38.2 ppm (cf. academic document "Macromolecules", (USA), American Chemical Society, 1999, vol. 32, p. 3817-3819). Since a position of this peak derived from methine carbon to which a branch having 5 or more carbon atoms is attached, is shifted depending on a measurement apparatus and measurement condition in some cases, usually, the position is determined by performing measurement of an authentic sample for every measurement apparatus and measurement condition. For spectral analysis, it is preferable to use a negative exponential function as a window function.

The ethylene-α-olefin copolymer of the present invention is produced by copolymerizing ethylene and an α-olefin using a catalyst formed by bringing the below-described component (B1), the below-described component (B2), the below-described component (C), and the below-described component (D) into contact with each other in the presence of the below-described component (A).

The molar ratio ((B1)/(B-2)) of the component (B1) to the component (B-2) is usually from 1 to 90.

Component (A): ethylene and/or an α-olefin.

Component (B1): a transition metal compound represented by the following formula (1):

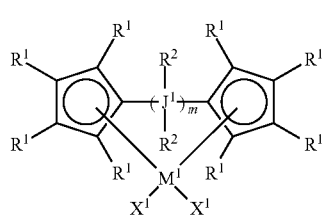

(1)

wherein $M^1$ represents a transition metal atom of Group 4 of the periodic table of the elements, $J^1$ represents an atom of Group 14 of the periodic table of the elements, m represents an integer of 1 to 5, $X^1$, $R^1$ and $R^2$ are respectively the same or different and represent a hydrogen atom, a halogen atom, an optionally substituted hydrocarbyl group having 1 to 20 carbon atoms, an optionally substituted hydrocarbyloxy group having 1 to 20 carbon atoms, a hydrocarbylsilyl group having 1 to 20 carbon atoms, or a hydrocarbylamino group having 1 to 20 carbon atoms, the $X^1$ groups may be the same or different, the $R^1$ groups may be the same or different, and the $R^2$ groups may be the same or different.

Component (B2): a transition metal compound represented by the following formula (2):

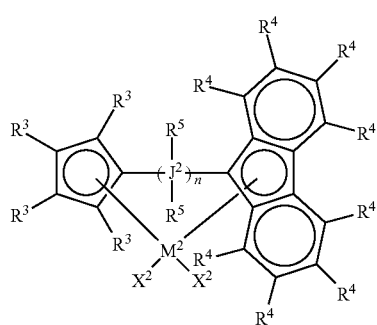

(2)

wherein $M^2$ represents a transition metal atom of Group 4 of the periodic table of the elements, $J^2$ represents an atom of Group 14 of the periodic table of the elements, n represents an integer of 1 to 5, $X^2$, $R^3$, $R^4$, and $R^5$ are respectively the same or different and represent a hydrogen atom, a halogen atom, an optionally substituted hydrocarbyl group having 1 to 20 carbon atoms, an optionally substituted hydrocarbyloxy group having 1 to 20 carbon atoms, a hydrocarbylsilyl group having 1 to 20 carbon atoms, or a hydrocarbylamino group having 1 to 20 carbon atoms, the $X^2$ groups may be the same or different, the $R^3$ groups may be the same or different, the $R^4$ groups may be the same or different, and the $R^5$ groups may be the same or different.

Component (C): the following component (C-1) and/or the following component (C-2).

Component (C-1): a solid catalyst component that is formed by bringing the following component (a) and the following component (b) into contact with each other.

Component (a): at least one compound selected from the group consisting of (a-1) organometallic compounds of metals of Group 13 of the periodic table of the elements, (a-2) organoaluminumoxy compound, and (a-3) boron compounds.

Component (b): a solid state carrier.

Component (C-2): a modified clay mineral that is formed by bringing an organic compound and a clay mineral into contact with each other.

Component (D): an organoaluminum compound.

Component (A) is a monomer to be used for polymerization, and it is ethylene and/or an α-olefin. Such α-olefins include olefins having 3 to 20 carbon atoms, examples of which include propylene, 1-butene, 1-pentene, 1-hexene, 1-heptene, 1-octene, 1-nonene, 1-decene, 1-dodecene, 4-methyl-1-pentene, and 4-methyl-1-hexene. These may be used singly or two or more of them may be used in combination.

Of these, the use of ethylene and one or more α-olefins selected from the group consisting of 1-butene, 1-hexene, 4-methyl-1-pentene, and 1-octene in combination is preferred.

$M^1$ of formula (1) and $M^2$ of formula (2) represent a transition metal atom of Group 4 of the periodic table of the elements, examples of which include a titanium atom, a zirconium atom, and a hafnium atom.

$J^1$ of formula (1) and $J^2$ of formula (2) represent an atom of Group 14 of the periodic table of the elements. Preferred is a carbon atom or a silicon atom.

m of formula (1) and n of formula (2) are integers of 1 to 5. m is preferably 1 to 2. n is preferably 1 to 2.

$X^1$, $R^1$, and $R^2$ of formula (1) and $X^2$, $R^3$, $R^4$, and $R^5$ of formula (2) are respectively the same or different and represent a hydrogen atom, a halogen atom, an optionally substituted hydrocarbyl group having 1 to 20 carbon atoms, an optionally substituted hydrocarbyloxy group having 1 to 20 carbon atoms, a hydrocarbylsilyl group having 1 to 20 carbon atoms, or a hydrocarbylamino group having 1 to 20 carbon atoms, the $X^1$ groups may be the same or different, the $R^1$ groups and $R^2$ groups may be the same or different, and the $X^2$ groups may be the same or different, and the $R^3$ groups and $R^4$ groups may be the same or different.

Examples of the halogen atoms of $X^1$, $R^1$, $R^2$, $X^2$, $R^3$, $R^4$, and $R^5$ include a fluorine atom, a chlorine atom, a bromine atom, and an iodine atom.

Examples of the optionally substituted hydrocarbyl groups having 1 to 20 carbon atoms of $X^1$, $R^1$, $R^2$, $X^2$, $R^3$, $R^4$, and $R^5$ include alkyl groups having 1 to 20 carbon atoms, halogenated alkyl groups having 1 to 20 carbon atoms, aralkyl groups having 7 to 20 carbon atoms, and aryl groups having 6 to 20 carbon atoms.

Examples of said alkyl groups having 1 to 20 carbon atoms include a methyl group, an ethyl group, a n-propyl group, an isopropyl group, a n-butyl group, a sec-butyl group, a tert-butyl group, a n-pentyl group, a neopethyl group, an isopentyl group, a n-hexyl group, a n-heptyl group, a n-octyl group, a n-decyl group, a n-nonyl group, a n-decyl group, a n-dodecyl group, a n-dodecyl group, a n-tridecyl group, a n-tetradecyl group, a n-pentadecyl group, a n-hexadecyl group, a n-heptadecyl group, a n-octadecyl group, a n-nonadecyl group, and a n-eicosyl group.

Examples of said halogenated alkyl groups having 1 to 20 carbon atoms include a fluoromethyl group, a difluoromethyl group, a trifluoromethyl group, a chloromethyl group, a dichloromethyl group, a trichloromethyl group, a bromomethyl group, a dibromomethyl group, a tribromomethyl group, an iodomethyl group, a diiodomethyl group, a triiodomethyl group, a fluoroethyl group, a difluoroethyl group, a trifluoroethyl group, a tetrafluoroethyl group, a pentafluoroethyl group, a chloroethyl group, a dichloroethyl group, a trichloroethyl group, a tetrachloroethyl group, a pentachloroethyl group, a bromoethyl group, a dibromoethyl group, a tribromoethyl group, a tetrabromoethyl group, a pentabromoethyl group, a perfluoropropyl group, a perfluorobutyl group, a perfluoropentyl group, a perfluorohexyl group, a perfluorooctyl group, a perfluorododecyl group, a perfluoropentadecyl group, a perfluoroeicosyl group, a perchloropropyl group, a perchlorobutyl group, a perchloropentyl group, a perchlorohexyl group, a perchlorooctyl group, a perchlorododecyl group, a perchloropentadecyl group, a perchloroeicosyl group, a perbromopropyl group, a perbromobutyl group, a perbromopentyl group, a perbromohexyl group, a perbromooctyl group, a perbromododecyl group, a perbromopentadecyl group, and a perbromoeicosyl group.

Examples of said aralkyl groups having 7 to 20 carbon atoms include a benzyl group, a (2-methylphenyl)methyl group, a (3-methylphenyl)methyl group, a (4-methylphenyl)methyl group, a (2,3-dimethylphenyl)methyl group, a (2,4-dimethylphenyl)methyl group, a (2,5-dimethylphenyl)methyl group, a (2,6-dimethylphenyl)methyl group, a (3,4-dimethylphenyl)methyl group, a (4,6-dimethylphenyl)methyl group, a (2,3,4-trimethylphenyl)methyl group, a (2,3,5-trimethylphenyl)methyl group, a (2,3,6-trimethylphenyl)methyl group, a (3,4,5-trimethylphenyl)methyl group, a (2,4,6-trimethylphenyl)methyl group, a (2,3,4,5-tetramethylphenyl)methyl group, a (2,3,4,6-tetramethylphenyl)methyl group, a (2,3 5,6-tetramethylphenyl)methyl group, a (pentamethylphenyl)methyl group, an (ethylphenyl)methyl group, a (n-propylphenyl)methyl group, an (isopropylphenyl)methyl group, a (n-butylphenyl)methyl group, a (sec-butylphenyl)methyl group, a (tert-butylphenyl)methyl group, a (n-pentylphenyl)methyl group, a (neopentylphenyl)methyl group, a (n-hexylphenyl)methyl group, a (n-octylphenyl)methyl group, a (n-decylphenyl)methyl group, a (n-decylphenyl)methyl group, a (n-tetradecylphenyl)methyl group, a naphthylmethyl group, an anthracenylmethyl group, a phenylethyl group, a phenylpropyl group, a phenylbutyl group, a diphenylmethyl group, a diphenylethyl group, a diphenylpropyl group, and a diphenylbutyl group. Additional examples include halogenated aralkyl groups in which these aralkyl groups are substituted with a halogen atom such as a fluorine atom, a chlorine atom, a bromine atom, or an iodine atom.

Examples of said aryl groups having 6 to 20 carbon atoms include a phenyl group, a 2-tolyl group, a 3-tolyl group, a 4-tolyl group, a 2,3-xylyl group, a 2,4-xylyl group, a 2,5-xylyl group, a 2,6-xylyl group, a 3,4-xylyl group, a 3,5-xylyl group, a 2,3,4-trimethylphenyl group, a 2,3,5-trimethylphenyl group, a 2,3,6-trimethylphenyl group, a 2,4,6-trimethylphenyl group, a 3,4,5-trimethylphenyl group, a 2,3,4,5-tetramethylphenyl group, a 2,3,4,6-tetramethylphenyl group, a 2,3,5,6-tetramethylphenyl group, a pentamethylphenyl group, an ethylphenyl group, a diethylphenyl group, a triethylphenyl group, a n-propylphenyl group, an isopropylphenyl group, a n-butylphenyl group, a sec-butylphenyl group, a tert-butylphenyl group, a n-pentylphenyl group, a neopentylphenyl group, a n-hexylphenyl group, a n-octylphenyl group, a n-decylphenyl group, a n-dodecylphenyl group, a n-tetradecylphenyl group, a naphthyl group, and an anthracenyl group. Additional examples include halogenated aryl groups in which these aryl groups are substituted with a halogen atom such as a fluorine atom, a chlorine atom, a bromine atom, or an iodine atom.

Examples of said optionally substituted hydrocarbyl groups having 1 to 20 carbon atoms include hydrocarbyl groups substituted with a hydrocarbylsilyl group, hydrocarbyl groups substituted with a hydrocarbylamino group, and hydrocarbyl groups substituted with a hydrocarbyloxy group.

Examples of said hydrocarbyl groups substituted with a hydrocarbylsilyl group include a trimethylsilylmethyl group, a trimethylsilylethyl group, a trimethylsilylpropyl group, a trimethylsilylbutyl group, a trimethylsilylphenyl group, a bis(trimethylsilyl)methyl group, a bis(trimethylsilyl)ethyl group, a bis(trimethylsilyl)propyl group, a bis(trimethylsilyl)butyl group, a bis(trimethylsilyl)phenyl group, and a triphenylsilylmethyl group.

Examples of said hydrocarbyl groups substituted with a hydrocarbylamino group include a dimethylaminomethyl group, a dimethylaminoethyl group, a dimethylaminopropyl group, a dimethylaminobutyl group, a dimethylaminophenyl group, a bis(dimethylamino)methyl group, a bis(dimethylamino)ethyl group, a bis(dimethylamino)propyl group, a bis(dimethylamino)butyl group, a bis(dimethylamino)phenyl group, a phenylaminomethyl group, a diphenylaminomethyl group, and a diphenylaminophenyl group.

Examples of said hydrocarbyl groups substituted with a hydrocarbyloxy group include a methoxymethyl group, an ethoxymethyl group, a n-propoxymethyl group, an isopropoxymethyl group, a n-butoxymethyl group, a sec-butoxymethyl group, a tert-butoxymethyl group, a phenoxymethyl group, a methoxyethyl group, an ethoxyethyl group, a n-propoxyethyl group, an isopropoxyethyl group, a n-butoxyethyl group, a sec-butoxyethyl group, a tert-butoxyethyl group, a phenoxyethyl group, a methoxy-n-propyl group, an ethoxy-n-propyl group, a n-propoxy-n-propyl group, an isopropoxy-n-propyl group, a n-butoxy-n-propyl group, a sec-butoxy-n-propyl group, a tert-butoxy-n-propyl group, a phenoxy-n-propyl group, a methoxyisopropyl group, an ethoxyisopropyl group, a n-propoxyisopropyl group, an isopropoxyisopropyl group, a n-butoxyisopropyl group, a sec-butoxyisopropyl group, a tert-butoxyisopropyl group, a phenoxyisopropyl group, a methoxyphenyl group, an ethoxyphenyl group, a n-propoxyphenyl group, an isopropoxyphenyl group, a n-butoxyphenyl group, a sec-butoxyphenyl group, a tert-butoxyphenyl group, and a phenoxyphenyl group.

Examples of the optionally substituted hydrocarbyloxy groups having 1 to 20 carbon atoms of $X^1$, $R^1$, $R^2$, $X^2$, $R^3$, $R^4$, and $R^5$ include alkoxy groups having 1 to 20 carbon atoms, aralkyloxy groups having 7 to 20 carbon atoms, and aryloxy groups having 6 to 20 carbon atoms.

Examples of such alkoxy groups having 1 to 20 carbon atoms include a methoxy group, an ethoxy group, a n-propoxy group, an isopropoxy group, a n-butoxy group, a sec-butoxy group, a tert-butoxy group, a n-pentyloxy group, a neopentyloxy group, a n-hexyloxy group, a n-octyloxy group, a n-nonyloxy group, a n-decyloxy group, a n-undecyloxy group, a n-dodecyloxy group, a n-tridecyloxy group, a n-tetradecyloxy group, a n-pentadecyloxy group, a n-hexadecyloxy group, a n-heptadecyloxy group, a n-heptadecyloxy group, a n-octadecyloxy group, a n-nonadecyloxy group, and a n-eicosoxy group. Additional examples include halogenated alkoxy groups in which these alkoxy groups are substituted with a halogen atom such as a fluorine atom, a chlorine atom, a bromine atom, or an iodine atom.

Examples of said aralkyloxy groups having 7 to 20 carbon atoms include a benzyloxy group, a (2-methylphenyl)methoxy group, a (3-methylphenyl)methoxy group, a (4-methylphenyl)methoxy group, a (2,3-dimethylphenyl)methoxy group, a (2,4-dimethylphenyl)methoxy group, a (2,5-dimethylphenyl)methoxy group, a (2,6-dimethylphenyl)methoxy group, a (3,4-dimethylphenyl)methoxy group, a (3,5-dimethylphenyl)methoxy group, a (2,3,4-trimethylphenyl)methoxy group, a (2,3,5-trimethylphenyl)methoxy group, a (2,3,6-trimethylphenyl)methoxy group, a (2,4,5-trimethylphenyl)methoxy group, a (2,4,6-trimethylphenyl)methoxy group, a (3,4,5-trimethylphenyl)methoxy group, a (2,3,4,5-tetramethylphenyl)methoxy group, a (2,3,4,6-tetramethylphenyl)methoxy group, a (2,3,5,6-tetramethylphenyl)methoxy group, a (pentamethylphenyl)methoxy group, an (ethylphenyl)methoxy group, a (n-propylphenyl)methoxy group, an (isopropylphenyl)methoxy group, a (n-butylphenyl)methoxy group, a (sec-butylphenyl)methoxy group, a (tert-butylphenyl)methoxy group, a (n-hexylphenyl)methoxy group, a (n-octylphenyl)methoxy group, a (n-decylphenyl)methoxy group, a (n-tetradecylphenyl)methoxy group, a naphthylmethoxy group, and an anthracenylmethoxy group. Additional examples include halogenated aralkyloxy groups in which these aralkyloxy groups are substituted with a halogen atom such as a fluorine atom, a chlorine atom, a bromine atom, or an iodine atom.

Examples of said aryloxy groups having 6 to 20 carbon atoms include a phenoxy group, a 2-methylphenoxy group, a 3-methylphenoxy group, a 4-methylphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2,3,4-trimethylphenoxy group, a 2,3,5-trimethylphenoxy group, a 2,3,6-trimethylphenoxy group, a 2,4,5-trimethylphenoxy group, a 2,4,6-trimethylphenoxy group, a 3,4,5-trimethylphenoxy group, a 2,3,4,5-tetramethylphenoxy group, a 2,3,4,6-tetramethylphenoxy group, a 2,3,5,6-tetramethylphenoxy group, a pentamethylphenoxy group, an ethylphenoxy group, a n-propylphenoxy group, an isopropylphenoxy group, a n-butylphenoxy group, a sec-butylphenoxy group, a tert-butylphenoxy group, a n-hexylphenoxy group, a n-octylphenoxy group, a n-decylphenoxy group, a n-tetradecylphenoxy group, a naphthoxy group, and an anthracenoxy group. Additional examples include halogenated aryloxy groups in which these aryloxy groups are substituted with a halogen atom such as a fluorine atom, a chlorine atom, a bromine atom, or an iodine atom.

The hydrocarbylsilyl groups having 1 to 20 carbon atoms of $X^1$, $R^2$, $X^2$, $R^3$, $R^4$, and $R^5$ are silyl groups substituted with a hydrocarbyl group having 1 to 20 carbon atoms, and examples of the hydrocarbyl group having 1 to 20 carbon atoms include alkyl groups having 1 to 20 carbon atoms and aryl groups having 6 to 20 carbon atoms. Examples of said hydrocarbylsilyl groups having 1 to 20 carbon atoms include monohydrocarbylsilyl groups having 1 to 20 carbon atoms, dihydrocarbylsilyl groups having 2 to 20 carbon atoms, and trihydrocarbylsilyl groups having 3 to 20 carbon atoms; examples of said monohydrocarbylsilyl groups having 1 to 20 carbon atoms include a methylsilyl group, an ethylsilyl group, a n-propylsilyl group, an isopropylsilyl group, a n-butylsilyl group, a sec-butylsilyl group, a tert-butylsilyl group, an isobutylsilyl group, a n-pentylsilyl group, a n-hexylsilyl group, and an phenylsilyl group, examples of said dihydrocarbylsilyl groups having 2 to 20 carbon atoms include a dimethylsilyl group, a diethylsilyl group, a di-n-propylsilyl group, a diisopropylsilyl group, a di-n-butylsilyl group, a di-sec-butylsilyl group, a di-tert-butylsilyl group, a diisobutylsilyl group, and a diphenylsilyl group, and examples of said trihydrocarbylsilyl groups having 3 to 20 carbon atoms include a trimethylsilyl group, a triethylsilyl group, a tri-n-propylsilyl group, a triisopropylsilyl group, a tri-n-butylsilyl group, a tri-sec-butylsilyl group, a tri-tert-butylsilyl group, a triisobutylsilyl group, a tert-butyl-dimethylsilyl group, a tri-n-pentylsilyl group, a tri-n-hexylsilyl group, a tricyclohexylsilyl group, and a triphenylsilyl group.

The hydrocarbylamino groups having 1 to 20 carbon atoms of $X^1$, $R^1$, $R^2$, $X^2$, $R^3$, $R^4$, and $R^5$ are amino groups substituted with a hydrocarbyl group having 1 to 20 carbon atoms, and examples of the hydrocarbyl group having 1 to 20 carbon atoms include alkyl groups having 1 to 20 carbon atoms, aryl groups having 6 to 20 carbon atoms, and aralkyl groups having 7 to 20 carbon atoms. Examples of said hydrocarbylamino groups having 1 to 20 carbon atoms include monohydrocarbylamino groups having 1 to 20 carbon atoms and dihydrocarbylamino groups having 2 to 20 carbon atoms; examples of said monohydrocarbylamino group having 1 to 20 carbon atoms include a methylamino group, an ethylamino group, a n-propylamino group, an isopropylamino group, a n-butylamino group, a sec-butylamino group, a tert-butylamino group, an isobutylamino group, a n-hexylamino group, a n-octylamino group, a n-decylamino group, a phenylamino group, and a benzylamino group, and examples of said dihydrocarbylamino group having 2 to 20 carbon atoms include a dimethylamino group, a diethylamino group, a di-n-propylamino group, a diisopropylamino group, a di-n-butylamino group, a di-sec-butylamino group, a di-tert-butylamino group, a di-isobutylamino group, a tert-butylisopropylamino group, a di-n-hexylamino group, a di-n-octylamino group, a di-n-decylamino group, a diphenylamino group, a dibenzylamino group, a tert-butylisopropylamino group, a phenylethylamino group, a phenylpropylamino group, a phenylbutylamino group, a pyrrolyl group, a pyrrolidinyl group, a piperidinyl group, a carbazolyl group, and a dihydroisoindolyl group.

Preferred as $X^1$ is a chlorine atom, a methyl group, an ethyl group, a n-propyl group, an isopropyl group, a n-butyl group, a methoxy group, an ethoxy group, a n-propoxy group, an isopropoxy group, a n-butoxy group, a trifluoromethoxy group, a phenyl group, a phenoxy group, a 2,6-di-tert-butylphenoxy group, a 3,4,5-trifluorophenoxy group, a pentafluorophenoxy group, a 2,3,5,6-tetrafluoro-4-pentafluorophenylphenoxy group, or a benzyl group.

Preferred as $R^1$ are a hydrogen atom and alkyl groups having 1 to 6 carbon atoms, more preferred are a hydrogen atom and alkyl groups having 1 to 4 carbon atoms, and even more preferred is a hydrogen atom.

Preferred as $R^2$ are alkyl groups having 1 to 6 carbon atoms, and more preferred are alkyl groups having 1 to 4 carbon atoms.

Preferred as $X^2$ are a chlorine atom, a methyl group, an ethyl group, a n-propyl group, an isopropyl group, a n-butyl group, a methoxy group, an ethoxy group, a n-propoxy group, an isopropoxy group, a n-butoxy group, a trifluoromethoxy group, a phenyl group, a phenoxy group, a 2,6-di-tert-butylphenoxy group, a 3,4,5-trifluorophenoxy group, a pentafluorophenoxy group, a 2,3,5,6-tetrafluoro-4-pentafluorophenylphenoxy group, and a benzyl group.

Preferred as $R^3$ are a hydrogen atom and alkyl groups having 1 to 6 carbon atoms, more preferred are a hydrogen atom and alkyl groups having 1 to 4 carbon atoms, and even more preferred is a hydrogen atom.

Preferred as $R^4$ are a hydrogen atom and alkyl groups having 1 to 6 carbon atoms, more preferred are a hydrogen atom and alkyl groups having 1 to 4 carbon atoms, and even more preferred is a hydrogen atom.

Preferred as $R^5$ are alkyl groups having 1 to 6 carbon atoms, and more preferred are alkyl groups having 1 to 4 carbon atoms.

Examples of the transition metal compound of the component (B1) represented by formula (1) in which $M^1$ is a zirconium atom and $X^1$ is a chlorine atom include methylenebis(cyclopentadienyl)zirconium dichloride, isopropylidenebis(cyclopentadienyl)zirconium dichloride, (methyl)(phenyl)methylenebis(cyclopentadienyl)zirconium dichloride, diphenylmethylenebis(cyclopentadienyl)zirconium dichloride, ethylenebis(cyclopentadienyl)zirconium dichloride, methylenebis(methylcyclopentadienyl)zirconium dichloride, isopropylidenebis(methylcyclopentadienyl)zirconium dichloride, (methyl)(phenyl)methylenebis(methylcyclopentadienyl)zirconium dichloride, diphenylmethylenebis(methylcyclopentadienyl)zirconium dichloride, ethylenebis(methylcyclopentadienyl)zirconium dichloride, methylene(cyclopentadienyl)(methylcyclopentadienyl)zirconium dichloride, isopropylidene(cyclopentadienyl)(methylcyclopentadienyl)zirconium dichloride, (methyl)(phenyl)methylene(cyclopentadienyl)(methylcyclopentadienyl)zirconium dichloride, diphenylmethylene(cyclopentadienyl)(methylcyclopentadienyl)zirconium dichloride, ethylene(cyclopentadienyl)(methylcyclopentadienyl)zirconium dichloride, methylenebis(2,3-dimethylcyclopentadienyl)zirconium dichloride, methylenebis(2,4-dimethylcyclopentadienyl)zirconium dichloride, methylenebis(2,5-dimethylcyclopentadienyl)zirconium dichloride, methylenebis(3,4-dimethylcyclopentadienyl)zirconium dichloride, isopropylidenebis(2,3-dimethylcyclopentadienyl)zirconium dichloride, isopropylidenebis(2,4-dimethylcyclopentadienyl)zirconium dichloride, isopropylidenebis(2,5-dimethylcyclopentadienyl)zirconium dichloride, Isopropylidenebis(3,4-dimethylcyclopentadienyl)zirconium dichloride, (methyl)(phenyl)methylenebis(2,3-dimethylcyclopentadienyl)zirconium dichloride, (methyl)(phenyl)methylenebis(2,4-dimethylcyclopentadienyl)zirconium dichloride, (methyl)(phenyl)methylenebis(2,5-dimethylcyclopentadienyl)zirconium dichloride, (methyl)(phenyl)methylenebis(3,4-dimethylcyclopentadienyl)zirconium dichloride, diphenylmethylenebis(2,3-dimethylcyclopentadienyl)zirconium dichloride, diphenylmethylenebis(2,4-dimethylcyclopentadienyl)zirconium dichloride, diphenylmethylenebis(2,5-dimethylcyclopentadienyl)zirconium dichloride, diphenylmethylenebis(3,4-dimethylcyclopentadienyl)zirconium dichloride, ethylenebis(2,3-dimethylcyclopentadienyl)zirconium dichloride, ethylenebis(2,4-dimethylcyclopentadienyl)zirconium dichloride, ethylenebis(2,5-dimethylcyclopentadienyl)zirconium dichloride, ethylenebis(3,4-dimethylcyclopentadienyl)zirconium dichloride, dimethylsilanediylbis(cyclopentadienyl)zirconium dichloride, diethylsilanediylbis(cyclopentadienyl)zirconium dichloride, di(n-propyl)silanediylbis(cyclopentadienyl)zirconium dichloride, diisopropylsilanediylbis(cyclopentadienyl)zirconium dichloride, dicyclohexylsilanediylbis(cyclopentadienyl)zirconium dichloride, diphenylsilanediylbis(cyclopentadienyl)zirconium dichloride, di(p-tolyl)silanediylbis(cyclopentadienyl)zirconium dichloride, divinylsilanediylbis(cyclopentadienyl)zirconium dichloride, diallylsilanediylbis(cyclopentadienyl)zirconium dichloride, (methyl)(vinyl)silanediylbis(cyclopentadienyl)zirconium dichloride, (allyl)(methyl)silanediylbis(cyclopentadienyl)zirconium dichloride, (ethyl)(methyl)silanediylbis(cyclopentadienyl)zirconium dichloride, (methyl)(n-propyl)silanediylbis(cyclopentadienyl)zirconium dichloride, (methyl)(isopropyl)silanediylbis(cyclopentadienyl)zirconium dichloride, (cyclohexyl)(methyl)bis(cyclopentadienyl)zirconium dichloride, (methyl)(phenyl)silanediylbis(cyclopentadienyl)zirconium dichloride, dimethylsilanediylbis(methylcyclopentadienyl)zirconium dichloride, diethylsilanediylbis(methylcyclopentadienyl)zirconium dichloride, di(n-propyl)silanediylbis(methylcyclopentadienyl)zirconium dichloride, diisopropylsilanediylbis(methylcyclopentadienyl)zirconium dichloride, dicyclohexylsilanediylbis(methylcyclopentadienyl)zirconium dichloride, diphenylsilanediylbis(methylcyclopentadienyl)zirconium dichloride, (ethyl)(methyl)silanediylbis(methylcyclopentadienyl)zirconium dichloride, (methyl)(n-propyl)silanediylbis(methylcyclopentadienyl)zirconium dichloride, (methyl)(isopropyl)silanediylbis(methylcyclopentadienyl)zirconium dichloride, (cyclohexyl)(methyl)bis(methylcyclopentadienyl)zirconium dichloride, (methyl)(phenyl)silanediylbis(methylcyclopentadienyl)zirconium dichloride, dimethylsilanediyl(cyclopentadienyl)(methylcyclopentadienyl)zirconium dichloride, diethylsilanediyl(cyclopentadienyl)(methylcyclopentadienyl)zirconium dichloride, di(n-propyl)silanediyl(cyclopentadienyl)(methylcyclopentadienyl)zirconium dichloride, diisopropylsilanediyl(cyclopentadienyl)(methylcyclopentadienyl)zirconium dichloride, dicyclohexylsilanediyl(cyclopentadienyl)(methylcyclopentadienyl)zirconium dichloride, diphenylsilanediyl(cyclopentadienyl)(methylcyclopentadienyl)zirconium dichloride, (ethyl)(methyl)silanediyl(cyclopentadienyl)(methylcyclopentadienyl)zirconium dichloride, (methyl)(n-propyl)silanediyl(cyclopentadienyl)(methylcyclopentadienyl)zirconium dichloride, (methyl)(isopropyl)silanediyl(cyclopentadienyl)(methylcyclopentadienyl)zirconium dichloride, (cyclohexyl)(methyl)(cyclopentadienyl)(methylcyclopentadienyl)zirconium dichloride, (methyl)(phenyl)silanediyl(cyclopentadienyl)(methylcyclopentadienyl)zirconium dichloride, dimethylsilanediylbis(2,3-dimethylcyclopentadienyl)zirconium dichloride, dimethylsilanediylbis(2,4-dimethylcyclopentadienyl)zirconium dichloride, dimethylsilanediylbis(2,5-dimethylcyclopentadienyl)zirconium dichloride, dimethylsilanediylbis(3,4-dimethylcyclopentadienyl)zirconium dichloride, diethylsilanediylbis(2,3-dimethylcyclopentadienyl)zirconium dichloride, diethylsilanediylbis(2,4-dimethylcyclopentadienyl)zirconium dichloride, diethylsilanediylbis(2,5-dimethylcyclopentadienyl)zirconium dichloride, diethylsilanediylbis(3,4-dimethylcyclopentadienyl)zirconium dichloride, di(n-propyl)silanediylbis(2,3-dimethylcyclopentadienyl)zirconium dichloride, di(n-propyl)silanediylbis(2,4-dimethylcyclopentadienyl)zirconium dichloride, di(n-propyl)silanediylbis(2,5-dimethylcyclopentadienyl)zirconium dichloride, di(n-propyl)silanediylbis(3,4-dimethylcyclopentadienyl)zirconium dichloride, diisopropylsilanediylbis(2,3-dimethylcyclopentadienyl)zirconium dichloride, diisopropylsilanediylbis(2,4-dimethylcyclopentadienyl)zirconium dichloride, diisopropylsilanediylbis(2,5-dimethylcyclopentadienyl)zirconium dichloride, diisopropylsilanediylbis(3,4-dimethylcyclopentadienyl)zirconium dichloride, dicyclohexylsilanediylbis(2,3-dimethylcyclopentadienyl)zirconium dichloride, dicyclohexylsilanediylbis(2,4-dimethylcyclopentadienyl)zirconium dichloride, dicyclohexylsilanediylbis(2,5-dimethylcyclopentadienyl)zirconium dichloride, dicyclohexylsilanediylbis(3,4-dimethylcyclopentadienyl)zirconium dichloride, diphenylsilanediylbis(2,3-dimethylcyclopentadienyl)zirconium dichloride, diphenylsilanediylbis(2,4-dimethylcyclopentadienyl)zirconium dichloride, diphenylsilanediylbis(2,5-dimethylcyclopentadienyl)zirconium dichloride, diphenylsilanediylbis(3,4-dimethylcyclopentadienyl)zirconium dichloride, (ethyl)(methyl)silanediylbis(2,3-dimethylcyclopentadienyl)zirconium dichloride, (ethyl)(methyl)silanediylbis(2,4-dimethylcyclopentadienyl)zirconium dichloride, (ethyl)(methyl)silanediylbis(2,5-dimethylcyclopentadienyl)zirconium dichloride, (ethyl)(methyl)silanediylbis(3,4-dimethylcyclopentadienyl)zirconium dichloride, (methyl)(n-propyl)silanediylbis(2,3-dimethylcyclopentadienyl)zirconium dichloride, (methyl)(n-propyl)silanediylbis(2,4-dimethylcyclopentadienyl)zirconium dichloride, (methyl)(n-propyl)silanediylbis(2,5-dimethylcyclopentadienyl)zirconium dichloride, (methyl)(n-propyl)silanediylbis(3,4-dimethylcyclopentadienyl)zirconium dichloride, (methyl)(isopropyl)silanediylbis(2,3-dimethylcyclopentadienyl)zirconium dichloride, (methyl)(isopropyl)silanediylbis(2,4-dimethylcyclopentadienyl)zirconium dichloride, (methyl)(isopropyl)silanediylbis(2,5-dimethylcyclopentadienyl)zirconium dichloride, (methyl)(isopropyl)silanediylbis(3,4-dimethylcyclopentadienyl)zirconium dichloride, (cyclohexyl)(methyl)bis(2,3-dimethylcyclopentadienyl)zirconium dichloride, (cyclohexyl)(methyl)bis(2,4-dimethylcyclopentadienyl)zirconium dichloride, (cyclohexyl)(methyl)bis(2,5-dimethylcyclopentadienyl)zirconium dichloride, (cyclohexyl)(methyl)bis(3,4-dimethylcyclopentadienyl)zirconium dichloride, (methyl)(phenyl)silanediylbis(2,3-dimethylcyclopentadienyl)zirconium dichloride, (methyl)(phenyl)silanediylbis(2,4-dimethylcyclopentadienyl)zirconium dichloride, (methyl)(phenyl)silanediylbis(2,5-dimethylcyclopentadienyl)zirconium dichloride, and (methyl)(phenyl)silanediylbis(3,4-dimethylcyclopentadienyl)zirconium dichloride.

A substituted body of the $\eta^5$-cyclopentadienyl group in the above examples, when a bridging group is at a 1-position, in the case of a monosubstituted body, includes substituted bodies at a 2-position, a 3-position, a 4-position, and a 5-position, and includes similarly all combinations when a bridging position is other than a 1-position. The substituent body includes similarly all combinations of substituents and bridging positions also in the case of a di- or more substituted body. Further examples include compounds derived from the above-described transition metal compounds by changing their dichloride of $X^1$ to difluoride, dibromide, diiodide, dimethyl, diethyl, diisopropyl, dimethoxide, diethoxide, dipropoxide, dibutoxide, bis(trifluoromethoxide), diphenyl, diphenoxide, bis(2,6-di-tert-butylphenoxide), bis(3,4,5-trifluorophenoxide), bis(pentafluorophenoxide), bis(2,3,5,6-tetrafluoro-4-pentafluorophenylphenoxide), dibenzyl, etc. Further examples include compounds in which zirconium of $M^1$ of the transition metal compound has been changed with titanium or hafnium.

Preferred as the transition metal compound of the component (B1) represented by formula (1) are dimethylsilanediylbis(cyclopentadienyl)zirconium dichloride and isopropylidenebis(cyclopentadienyl)zirconium dichloride.

As for the transition metal compound of component (B2) represented by formula (2), examples of compounds having a zirconium atom as $M^2$, a chlorine atom as $X^2$, and a diphenylmethylene group as the bridging group $[-(J^2(R^5)_2)_n-]$ include diphenylmethylene(1-cyclopentadienyl)(9-fluorenyl)zirconium dichloride, diphenylmethylene(2-methyl-1-cyclopentadienyl)(9-fluorenyl)zirconium dichloride, diphenylmethylene(3-methyl-1-cyclopentadienyl)(9-fluorenyl)zirconium dichloride, diphenylmethylene(2,4-dimethyl-1-cyclopentadienyl)(9-fluorenyl)zirconium dichloride, diphenylmethylene(2,5-dimethyl-1-cyclopentadienyl)(9-fluorenyl)zirconium dichloride, diphenylmethylene(3,4-dimethyl-1-cyclopentadienyl)(9-fluorenyl)zirconium dichloride, diphenylmethylene(2,3,4-trimethyl-1-cyclopentadienyl)(9-fluorenyl)zirconium dichloride, diphenylmethylene(2,3,5-trimethyl-1-cyclopentadienyl)(9-fluorenyl)zirconium dichloride, diphenylmethylene(3,4,5-trimethyl-1-cyclopentadienyl)(9-fluorenyl)zirconium dichloride, diphenylmethylene(2,3,4,5-tetramethyl-1-cyclopentadienyl)(9-fluorenyl)zirconium dichloride, diphenylmethylene(2-ethyl-1-cyclopentadienyl)(9-fluorenyl)zirconium dichloride, diphenylmethylene(3-ethyl-1-cyclopentadienyl)(9-fluorenyl)zirconium dichloride, diphenylmethylene(2,4-diethyl-1-cyclopentadienyl)(9-fluorenyl)zirconium dichloride, diphenylmethylene(2,5-diethyl-1-cyclopentadienyl)(9-fluorenyl)zirconium dichloride, diphenylmethylene(3,4-diethyl-1-cyclopentadienyl)(9-fluorenyl)zirconium dichloride, diphenylmethylene(2,3,4-triethyl-1-cyclopentadienyl)(9-fluorenyl)zirconium dichloride, diphenylmethylene(2,3,5-triethyl-1-cyclopentadienyl)(9-fluorenyl)zirconium dichloride, diphenylmethylene(3,4,5-triethyl-1-cyclopentadienyl)(9-fluorenyl)zirconium dichloride, diphenylmethylene(2,3,4,5-tetraethyl-1-cyclopentadienyl)(9-fluorenyl)zirconium dichloride, diphenylmethylene(2-n-propyl-1-cyclopentadienyl)(9-fluorenyl)zirconium dichloride, diphenylmethylene(3-n-propyl-1-cyclopentadienyl)(9-fluorenyl)zirconium dichloride, diphenylmethylene(2,4-di-n-propyl-1-cyclopentadienyl)(9-fluorenyl)zirconium dichloride, diphenylmethylene(2,5-di-n-propyl-1-cyclopentadienyl)(9-fluorenyl)zirconium dichloride, diphenylmethylene(3,4-di-n-propyl-1-cyclopentadienyl)(9-fluorenyl)zirconium dichloride, diphenylmethylene(2,3,4-tri-n-propyl-1-cyclopentadienyl)(9-fluorenyl)zirconium dichloride, diphenylmethylene(2,3,5-tri-n-propyl-1-cyclopentadienyl)(9-fluorenyl)zirconium dichloride, diphenylmethylene(3,4,5-tri-n-propyl-1-cyclopentadienyl)(9-fluorenyl)zirconium dichloride, diphenylmethylene(2,3,4,5-tetra-n-propyl-1-cyclopentadienyl)(9-fluorenyl)zirconium dichloride, diphenylmethylene(2-isopropyl-1-cyclopentadienyl)(9-fluorenyl)zirconium dichloride, diphenylmethylene(3-isopropyl-1-cyclopentadienyl)(9-fluorenyl)zirconium dichloride, diphenylmethylene(2,4-diisopropyl-1-cyclopentadienyl)(9-fluorenyl)zirconium dichloride, diphenylmethylene(2,5-diisopropyl-1-cyclopentadienyl)(9-fluorenyl)zirconium dichloride, diphenylmethylene(3,4-diisopropyl-1-cyclopentadienyl)(9-fluorenyl)zirconium dichloride, diphenylmethylene(2,3,4-triisopropyl-1-cyclopentadienyl)(9-fluorenyl)zirconium dichloride, diphenylmethylene(2,3,5-triisopropyl-1-cyclopentadienyl)(9-fluorenyl)zirconium dichloride, diphenylmethylene(3,4,5-triisopropyl-1-cyclopentadienyl)(9-fluorenyl)zirconium dichloride, diphenylmethylene(2,3,4,5-tetraisopropyl-1-cyclopentadienyl)(9-fluorenyl)zirconium dichloride, diphenylmethylene(2-phenyl-1-cyclopentadienyl)(9-fluorenyl)zirconium dichloride, diphenylmethylene(3-phenyl-1-cyclopentadienyl)(9-fluorenyl)zirconium dichloride, diphenylmethylene(2,4-diphenyl-1-cyclopentadienyl)(9-fluorenyl)zirconium dichloride, diphenylmethylene(2,5-diphenyl-1-cyclopentadienyl)(9-fluorenyl)zirconium dichloride, diphenylmethylene(3,4-diphenyl-1-cyclopentadienyl)(9-fluorenyl)zirconium dichloride, diphenylmethylene(2,3,4-triphenyl-1-cyclopentadienyl)(9-fluorenyl)zirconium dichloride, diphenylmethylene(2,3,5-triphenyl-1-cyclopentadienyl)(9-fluorenyl)zirconium dichloride, diphenylmethylene(3,4,5-triphenyl-1-cyclopentadienyl)(9-fluorenyl)zirconium dichloride, diphenylmethylene(2,3,4,5-tetraphenyl-1-cyclopentadienyl)(9-fluorenyl)

zirconium dichloride, diphenylmethylene(2-trimethylsilyl-1-cyclopentadienyl)(9-fluorenyl)zirconium dichloride, diphenylmethylene(3-trimethylsilyl-1-cyclopentadienyl)(9-fluorenyl)zirconium dichloride, diphenylmethylene(2,4-bis(trimethylsilyl)-1-cyclopentadienyl)(9-fluorenyl)zirconium dichloride, diphenylmethylene(2,5-bis(trimethylsilyl)-1-cyclopentadienyl)(9-fluorenyl)zirconium dichloride, diphenylmethylene(3,4-bis(trimethylsilyl)-1-cyclopentadienyl)(9-fluorenyl)zirconium dichloride, diphenylmethylene(2,3,4-tris(trimethylsilyl)-1-cyclopentadienyl)(9-fluorenyl)zirconium dichloride, diphenylmethylene(2,3,5-tris(trimethylsilyl)-1-cyclopentadienyl)(9-fluorenyl)zirconium dichloride, diphenylmethylene(3,4,5-tris(trimethylsilyl)-1-cyclopentadienyl)(9-fluorenyl)zirconium dichloride, diphenylmethylene(2,3,4,5-tetrakis(trimethylsilyl)-1-cyclopentadienyl)(9-fluorenyl)zirconium dichloride, diphenylmethylene(1-cyclopentadienyl)(2,7-dimethyl-9-fluorenyl)zirconium dichloride, diphenylmethylene(2-methyl-1-cyclopentadienyl)(2,7-dimethyl-9-fluorenyl)zirconium dichloride, diphenylmethylene(3-methyl-1-cyclopentadienyl)(2,7-dimethyl-9-fluorenyl)zirconium dichloride, diphenylmethylene(2,4-dimethyl-1-cyclopentadienyl)(2,7-dimethyl-9-fluorenyl)zirconium dichloride, diphenylmethylene(2,5-dimethyl-1-cyclopentadienyl)(2,7-dimethyl-9-fluorenyl)zirconium dichloride, diphenylmethylene(3,4-dimethyl-1-cyclopentadienyl)(2,7-dimethyl-9-fluorenyl)zirconium dichloride, diphenylmethylene(2,3,4-trimethyl-1-cyclopentadienyl)(2,7-dimethyl-9-fluorenyl)zirconium dichloride, diphenylmethylene(2,3,5-trimethyl-1-cyclopentadienyl)(2,7-dimethyl-9-fluorenyl)zirconium dichloride, diphenylmethylene(3,4,5-trimethyl-1-cyclopentadienyl)(2,7-dimethyl-9-fluorenyl)zirconium dichloride, diphenylmethylene(2,3,4,5-tetramethyl-1-cyclopentadienyl)(2,7-dimethyl-9-fluorenyl)zirconium dichloride, diphenylmethylene(2-ethyl-1-cyclopentadienyl)(2,7-dimethyl-9-fluorenyl)zirconium dichloride, diphenylmethylene(3-ethyl-1-cyclopentadienyl)(2,7-dimethyl-9-fluorenyl)zirconium dichloride, diphenylmethylene(2,4-diethyl-1-cyclopentadienyl)(2,7-dimethyl-9-fluorenyl)zirconium dichloride, diphenylmethylene(2,5-diethyl-1-cyclopentadienyl)(2,7-dimethyl-9-fluorenyl)zirconium dichloride, diphenylmethylene(3,4-diethyl-1-cyclopentadienyl)(2,7-dimethyl-9-fluorenyl)zirconium dichloride, diphenylmethylene(2,3,4-triethyl-1-cyclopentadienyl)(2,7-dimethyl-9-fluorenyl)zirconium dichloride, diphenylmethylene(2,3,5-triethyl-1-cyclopentadienyl)(2,7-dimethyl-9-fluorenyl)zirconium dichloride, diphenylmethylene(3,4,5-triethyl-1-cyclopentadienyl)(2,7-dimethyl-9-fluorenyl)zirconium dichloride, diphenylmethylene(2,3,4,5-tetraethyl-1-cyclopentadienyl)(2,7-dimethyl-9-fluorenyl)zirconium dichloride, diphenylmethylene(2-n-propyl-1-cyclopentadienyl)(2,7-dimethyl-9-fluorenyl)zirconium dichloride, diphenylmethylene(3-n-propyl-1-cyclopentadienyl)(2,7-dimethyl-9-fluorenyl)zirconium dichloride, diphenylmethylene(2,4-di-n-propyl-1-cyclopentadienyl)(2,7-dimethyl-9-fluorenyl)zirconium dichloride, diphenylmethylene(2,5-di-n-propyl-1-cyclopentadienyl)(2,7-dimethyl-9-fluorenyl)zirconium dichloride, diphenylmethylene(3,4-di-n-propyl-1-cyclopentadienyl)(2,7-dimethyl-9-fluorenyl)zirconium dichloride, diphenylmethylene(2,3,4-tri-n-propyl-1-cyclopentadienyl)(2,7-dimethyl-9-fluorenyl)zirconium dichloride, diphenylmethylene(2,3,5-tri-n-propyl-1-cyclopentadienyl)(2,7-dimethyl-9-fluorenyl)zirconium dichloride, diphenylmethylene(3,4,5-tri-n-propyl-1-cyclopentadienyl)(2,7-dimethyl-9-fluorenyl)zirconium dichloride, diphenylmethylene(2,3,4,5-tetra-n-propyl-1-cyclopentadienyl)(2,7-dimethyl-9-fluorenyl)zirconium dichloride, diphenylmethylene(2-isopropyl-1-cyclopentadienyl)(2,7-dimethyl-9-fluorenyl)zirconium dichloride, diphenylmethylene(3-isopropyl-1-cyclopentadienyl)(2,7-dimethyl-9-fluorenyl)zirconium dichloride, diphenylmethylene(2,4-diisopropyl-1-cyclopentadienyl)(2,7-dimethyl-9-fluorenyl)zirconium dichloride, diphenylmethylene(2,5-diisopropyl-1-cyclopentadienyl)(2,7-dimethyl-9-fluorenyl)zirconium dichloride, diphenylmethylene(3,4-diisopropyl-1-cyclopentadienyl)(2,7-dimethyl-9-fluorenyl)zirconium dichloride, diphenylmethylene(2,3,4-triisopropyl-1-cyclopentadienyl)(2,7-dimethyl-9-fluorenyl)zirconium dichloride, diphenylmethylene(2,3,5-triisopropyl-1-cyclopentadienyl)(2,7-dimethyl-9-fluorenyl)zirconium dichloride, diphenylmethylene(3,4,5-triisopropyl-1-cyclopentadienyl)(2,7-dimethyl-9-fluorenyl)zirconium dichloride, diphenylmethylene(2,3,4,5-tetraisopropyl-1-cyclopentadienyl)(2,7-dimethyl-9-fluorenyl)zirconium dichloride, diphenylmethylene(2-phenyl-1-cyclopentadienyl)(2,7-dimethyl-9-fluorenyl)zirconium dichloride, diphenylmethylene(3-phenyl-1-cyclopentadienyl)(2,7-dimethyl-9-fluorenyl)zirconium dichloride, diphenylmethylene(2,4-diphenyl-1-cyclopentadienyl)(2,7-dimethyl-9-fluorenyl)zirconium dichloride, diphenylmethylene(2,5-diphenyl-1-cyclopentadienyl)(2,7-dimethyl-9-fluorenyl)zirconium dichloride, diphenylmethylene(3,4-diphenyl-1-cyclopentadienyl)(2,7-dimethyl-9-fluorenyl)zirconium dichloride, diphenylmethylene(2,3,4-triphenyl-1-cyclopentadienyl)(2,7-dimethyl-9-fluorenyl)zirconium dichloride, diphenylmethylene(2,3,5-triphenyl-1-cyclopentadienyl)(2,7-dimethyl-9-fluorenyl)zirconium dichloride, diphenylmethylene(3,4,5-triphenyl-1-cyclopentadienyl)(2,7-dimethyl-9-fluorenyl)zirconium dichloride, diphenylmethylene(2,3,4,5-tetraphenyl-1-cyclopentadienyl)(2,7-dimethyl-9-fluorenyl)zirconium dichloride, diphenylmethylene(2-trimethylsilyl-1-cyclopentadienyl)(2,7-dimethyl-9-fluorenyl)zirconium dichloride, diphenylmethylene(3-trimethylsilyl-1-cyclopentadienyl)(2,7-dimethyl-9-fluorenyl)zirconium dichloride, diphenylmethylene(2,4-bis(trimethylsilyl)-1-cyclopentadienyl)(2,7-dimethyl-9-fluorenyl)zirconium dichloride, diphenylmethylene(2,5-bis(trimethylsilyl)-1-cyclopentadienyl)(2,7-dimethyl-9-fluorenyl)zirconium dichloride, diphenylmethylene(3,4-bis(trimethylsilyl)-1-cyclopentadienyl)(2,7-dimethyl-9-fluorenyl)zirconium dichloride, diphenylmethylene(2,3,4-tris(trimethylsilyl)-1-cyclopentadienyl)(2,7-dimethyl-9-fluorenyl)zirconium dichloride, diphenylmethylene(2,3,5-tris(trimethylsilyl)-1-cyclopentadienyl)(2,7-dimethyl-9-fluorenyl)zirconium dichloride, diphenylmethylene(3,4,5-tris(trimethylsilyl)-1-cyclopentadienyl)(2,7-dimethyl-9-fluorenyl)zirconium dichloride, diphenylmethylene(2,3,4,5-tetrakis(trimethylsilyl)-1-cyclopentadienyl)(2,7-dimethyl-9-fluorenyl)zirconium dichloride, diphenylmethylene(1-cyclopentadienyl)(2,7-diethyl-9-fluorenyl)zirconium dichloride, diphenylmethylene(2-methyl-1-cyclopentadienyl)(2,7-diethyl-9-fluorenyl)zirconium dichloride, diphenylmethylene(3-methyl-1-cyclopentadienyl)(2,7-diethyl-9-fluorenyl)zirconium dichloride, diphenylmethylene(2,4-dimethyl-1-cyclopentadienyl)(2,7-diethyl-9-fluorenyl)zirconium dichloride, diphenylmethylene(2,5-dimethyl-1-cyclopentadienyl)(2,7-diethyl-9-fluorenyl)zirconium dichloride, diphenylmethylene(3,4-dimethyl-1-cyclopentadienyl)(2,7-diethyl-9-fluorenyl)zirconium dichloride, diphenylmethylene(2,3,4-trimethyl-1-cyclopentadienyl)(2,7-diethyl-9-fluorenyl)zirconium dichloride, diphenylmethylene(2,3,5-trimethyl-1-cyclopentadienyl)(2,7-diethyl-9-fluorenyl)zirconium dichloride, diphenylmethylene(3,4,5-trimethyl-1-cyclopentadienyl)(2,7-diethyl-9-fluorenyl)zirconium dichloride, diphenylmethylene(2,3,4,5-tetramethyl-1-cyclopentadienyl)(2,7-diethyl-9-fluorenyl)

zirconium dichloride, diphenylmethylene(2-ethyl-1-cyclopentadienyl)(2,7-diethyl-9-fluorenyl)zirconium dichloride, diphenylmethylene(3-ethyl-1-cyclopentadienyl)(2,7-diethyl-9-fluorenyl)zirconium dichloride, diphenylmethylene(2,4-diethyl-1-cyclopentadienyl)(2,7-diethyl-9-fluorenyl)zirconium dichloride, diphenylmethylene(2,5-diethyl-1-cyclopentadienyl)(2,7-diethyl-9-fluorenyl)zirconium dichloride, diphenylmethylene(3,4-diethyl-1-cyclopentadienyl)(2,7-diethyl-9-fluorenyl)zirconium dichloride, diphenylmethylene(2,3,4-triethyl-1-cyclopentadienyl)(2,7-diethyl-9-fluorenyl)zirconium dichloride, diphenylmethylene(2,3,5-triethyl-1-cyclopentadienyl)(2,7-diethyl-9-fluorenyl)zirconium dichloride, diphenylmethylene(3,4,5-triethyl-1-cyclopentadienyl)(2,7-diethyl-9-fluorenyl)zirconium dichloride, diphenylmethylene(2,3,4,5-tetraethyl-1-cyclopentadienyl)(2,7-diethyl-9-fluorenyl)zirconium dichloride, diphenylmethylene(2-n-propyl-1-cyclopentadienyl)(2,7-diethyl-9-fluorenyl)zirconium dichloride, diphenylmethylene(3-n-propyl-1-cyclopentadienyl)(2,7-diethyl-9-fluorenyl)zirconium dichloride, diphenylmethylene(2,4-di-n-propyl-1-cyclopentadienyl)(2,7-diethyl-9-fluorenyl)zirconium dichloride, diphenylmethylene(2,5-di-n-propyl-1-cyclopentadienyl)(2,7-diethyl-9-fluorenyl)zirconium dichloride, diphenylmethylene(3,4-di-n-propyl-1-cyclopentadienyl)(2,7-diethyl-9-fluorenyl)zirconium dichloride, diphenylmethylene(2,3,4-tri-n-propyl-1-cyclopentadienyl)(2,7-diethyl-9-fluorenyl)zirconium dichloride, diphenylmethylene(2,3,5-tri-n-propyl-1-cyclopentadienyl)(2,7-diethyl-9-fluorenyl)zirconium dichloride, diphenylmethylene(3,4,5-tri-n-propyl-1-cyclopentadienyl)(2,7-diethyl-9-fluorenyl)zirconium dichloride, diphenylmethylene(2,3,4,5-tetra-n-propyl-1-cyclopentadienyl)(2,7-diethyl-9-fluorenyl)zirconium dichloride, diphenylmethylene(2-isopropyl-1-cyclopentadienyl)(2,7-diethyl-9-fluorenyl)zirconium dichloride, diphenylmethylene(3-isopropyl-1-cyclopentadienyl)(2,7-diethyl-9-fluorenyl)zirconium dichloride, diphenylmethylene(2,4-diisopropyl-1-cyclopentadienyl)(2,7-diethyl-9-fluorenyl)zirconium dichloride, diphenylmethylene(2,5-diisopropyl-1-cyclopentadienyl)(2,7-diethyl-9-fluorenyl)zirconium dichloride, diphenylmethylene(3,4-diisopropyl-1-cyclopentadienyl)(2,7-diethyl-9-fluorenyl)zirconium dichloride, diphenylmethylene(2,3,4-triisopropyl-1-cyclopentadienyl)(2,7-diethyl-9-fluorenyl)zirconium dichloride, diphenylmethylene(2,3,5-triisopropyl-1-cyclopentadienyl)(2,7-diethyl-9-fluorenyl)zirconium dichloride, diphenylmethylene(3,4,5-triisopropyl-1-cyclopentadienyl)(2,7-diethyl-9-fluorenyl)zirconium dichloride, diphenylmethylene(2,3,4,5-tetraisopropyl-1-cyclopentadienyl)(2,7-diethyl-9-fluorenyl)zirconium dichloride, diphenylmethylene(2-phenyl-1-cyclopentadienyl)(2,7-diethyl-9-fluorenyl)zirconium dichloride, diphenylmethylene(3-phenyl-1-cyclopentadienyl)(2,7-diethyl-9-fluorenyl)zirconium dichloride, diphenylmethylene(2,4-diphenyl-1-cyclopentadienyl)(2,7-diethyl-9-fluorenyl)zirconium dichloride, diphenylmethylene(2,5-diphenyl-1-cyclopentadienyl)(2,7-diethyl-9-fluorenyl)zirconium dichloride, diphenylmethylene(3,4-diphenyl-1-cyclopentadienyl)(2,7-diethyl-9-fluorenyl)zirconium dichloride, diphenylmethylene(2,3,4-triphenyl-1-cyclopentadienyl)(2,7-diethyl-9-fluorenyl)zirconium dichloride, diphenylmethylene(2,3,5-triphenyl-1-cyclopentadienyl)(2,7-diethyl-9-fluorenyl)zirconium dichloride, diphenylmethylene(3,4,5-triphenyl-1-cyclopentadienyl)(2,7-diethyl-9-fluorenyl)zirconium dichloride, diphenylmethylene(2,3,4,5-tetraphenyl-1-cyclopentadienyl)(2,7-diethyl-9-fluorenyl)zirconium dichloride, diphenylmethylene(2-trimethylsilyl-1-cyclopentadienyl)(2,7-diethyl-9-fluorenyl)zirconium dichloride, diphenylmethylene(3-trimethylsilyl-1-cyclopentadienyl)(2,7-diethyl-9-fluorenyl)zirconium dichloride, diphenylmethylene(2,4-bis(trimethylsilyl)-1-cyclopentadienyl)(2,7-diethyl-9-fluorenyl)zirconium dichloride, diphenylmethylene(2,5-bis(trimethylsilyl)-1-cyclopentadienyl)(2,7-diethyl-9-fluorenyl)zirconium dichloride, diphenylmethylene(3,4-bis(trimethylsilyl)-1-cyclopentadienyl)(2,7-diethyl-9-fluorenyl)zirconium dichloride, diphenylmethylene(2,3,4-tris(trimethylsilyl)-1-cyclopentadienyl)(2,7-diethyl-9-fluorenyl)zirconium dichloride, diphenylmethylene(2,3,5-tris(trimethylsilyl)-1-cyclopentadienyl)(2,7-diethyl-9-fluorenyl)zirconium dichloride, diphenylmethylene(3,4,5-tris(trimethylsilyl)-1-cyclopentadienyl)(2,7-diethyl-9-fluorenyl)zirconium dichloride, diphenylmethylene(2,3,4,5-tetrakis(trimethylsilyl)-1-cyclopentadienyl)(2,7-diethyl-9-fluorenyl)zirconium dichloride, diphenylmethylene(1-cyclopentadienyl)(2,7-di-tert-butyl-9-fluorenyl)zirconium dichloride, diphenylmethylene(2-methyl-1-cyclopentadienyl)(2,7-di-tert-butyl-9-fluorenyl)zirconium dichloride, diphenylmethylene(3-methyl-1-cyclopentadienyl)(2,7-di-tert-butyl-9-fluorenyl)zirconium dichloride, diphenylmethylene(2,4-dimethyl-1-cyclopentadienyl)(2,7-di-tert-butyl-9-fluorenyl)zirconium dichloride, diphenylmethylene(2,5-dimethyl-1-cyclopentadienyl)(2,7-di-tert-butyl-9-fluorenyl)zirconium dichloride, diphenylmethylene(3,4-dimethyl-1-cyclopentadienyl)(2,7-di-tert-butyl-9-fluorenyl)zirconium dichloride, diphenylmethylene(2,3,4-trimethyl-1-cyclopentadienyl)(2,7-di-tert-butyl-9-fluorenyl)zirconium dichloride, diphenylmethylene(2,3,5-trimethyl-1-cyclopentadienyl)(2,7-di-tert-butyl-9-fluorenyl)zirconium dichloride, diphenylmethylene(3,4,5-trimethyl-1-cyclopentadienyl)(2,7-di-tert-butyl-9-fluorenyl)zirconium dichloride, diphenylmethylene(2,3,4,5-tetramethyl-1-cyclopentadienyl)(2,7-di-tert-butyl-9-fluorenyl)zirconium dichloride, diphenylmethylene(2-ethyl-1-cyclopentadienyl)(2,7-di-tert-butyl-9-fluorenyl)zirconium dichloride, diphenylmethylene(3-ethyl-1-cyclopentadienyl)(2,7-di-tert-butyl-9-fluorenyl)zirconium dichloride, diphenylmethylene(2,4-diethyl-1-cyclopentadienyl)(2,7-di-tert-butyl-9-fluorenyl)zirconium dichloride, diphenylmethylene(2,5-diethyl-1-cyclopentadienyl)(2,7-di-tert-butyl-9-fluorenyl)zirconium dichloride, diphenylmethylene(3,4-diethyl-1-cyclopentadienyl)(2,7-di-tert-butyl-9-fluorenyl)zirconium dichloride, diphenylmethylene(2,3,4-triethyl-1-cyclopentadienyl)(2,7-di-tert-butyl-9-fluorenyl)zirconium dichloride, diphenylmethylene(2,3,5-triethyl-1-cyclopentadienyl)(2,7-di-tert-butyl-9-fluorenyl)zirconium dichloride, diphenylmethylene(3,4,5-triethyl-1-cyclopentadienyl)(2,7-di-tert-butyl-9-fluorenyl)zirconium dichloride, diphenylmethylene(2,3,4,5-tetraethyl-1-cyclopentadienyl)(2,7-di-tert-butyl-9-fluorenyl)zirconium dichloride, diphenylmethylene(2-n-propyl-1-cyclopentadienyl)(2,7-di-ter t-butyl-9-fluorenyl)zirconium dichloride, diphenylmethylene(3-n-propyl-1-cyclopentadienyl)(2,7-di-ter t-butyl-9-fluorenyl)zirconium dichloride, diphenylmethylene(2,4-di-n-propyl-1-cyclopentadienyl)(2,7-di-tert-butyl-9-fluorenyl)zirconium dichloride, diphenylmethylene(2,5-di-n-propyl-1-cyclopentadienyl)(2,7-di-tert-butyl-9-fluorenyl)zirconium dichloride, diphenylmethylene(3,4-di-n-propyl-1-cyclopentadienyl)(2,7-di-tert-butyl-9-fluorenyl)zirconium dichloride, diphenylmethylene(2,3,4-tri-n-propyl-1-cyclopentadienyl)(2,7-di-tert-butyl-9-fluorenyl)zirconium dichloride, diphenylmethylene(2,3,5-tri-n-propyl-1-cyclopentadienyl)(2,7-di-tert-butyl-9-fluorenyl)zirconium dichloride, diphenylmethylene(3,4,5-tri-n-propyl-1-cyclopentadienyl)(2,7-di-tert-butyl-9-fluorenyl)zirconium dichloride, diphenylmethylene(2,3,4,5-tetra-n-propyl-1-cyclopentadienyl)(2,7-di-tert-butyl-9-fluorenyl)zirconium dichloride, diphenylmethylene(2- isopropyl-1-cyclopentadienyl)(2,7-di-tert-butyl-9-fluorenyl) zirconium dichloride, diphenylmethylene(3-isopropyl-1-cyclopentadienyl)(2,7-di-tert-butyl-9-fluorenyl)zirconium dichloride, diphenylmethylene(2,4-diisopropyl-1-cyclopentadienyl)(2,7-di-tert-butyl-9-fluorenyl)zirconium dichloride, diphenylmethylene(2,5-diisopropyl-1-cyclopentadienyl)(2,7-di-tert-butyl-9-fluorenyl)zirconium dichloride, diphenylmethylene(3,4-diisopropyl-1-cyclopentadienyl)(2,7-di-tert-butyl-9-fluorenyl)zirconium dichloride, diphenylmethylene (2,3,4-triisopropyl-1-cyclopentadienyl)(2,7-di-tert-butyl-9-fluorenyl)zirconium dichloride, diphenylmethylene(2,3,5-triisopropyl-1-cyclopentadienyl)(2,7-di-tert-butyl-9-fluorenyl)zirconium dichloride, diphenylmethylene(3,4,5-triisopropyl-1-cyclopentadienyl)(2,7-di-tert-butyl-9-fluorenyl)zirconium dichloride, diphenylmethylene(2,3,4,5-tetraisopropyl-1-cyclopentadienyl)(2,7-di-tert-butyl-9-fluorenyl)zirconium dichloride, diphenylmethylene(2-phenyl-1-cyclopentadienyl)(2,7-di-tert-butyl-9-fluorenyl) zirconium dichloride, diphenylmethylene(3-phenyl-1-cyclopentadienyl)(2,7-di-tert-butyl-9-fluorenyl)zirconium dichloride, diphenylmethylene(2,4-diphenyl-1-cyclopentadienyl)(2,7-di-tert-butyl-9-fluorenyl)zirconium dichloride, diphenylmethylene(2,5-diphenyl-1-cyclopentadienyl)(2,7-di-tert-butyl-9-fluorenyl)zirconium dichloride, diphenylmethylene(3,4-diphenyl-1-cyclopentadienyl)(2,7-di-tert-butyl-9-fluorenyl)zirconium dichloride, diphenylmethylene(2,3,4-triphenyl-1-cyclopentadienyl)(2,7-di-tert-butyl-9-fluorenyl)zirconium dichloride, diphenylmethylene(2,3,5-triphenyl-1-cyclopentadienyl)(2,7-di-tert-butyl-9-fluorenyl) zirconium dichloride, diphenylmethylene(3,4,5-triphenyl-1-cyclopentadienyl)(2,7-di-tert-butyl-9-fluorenyl)zirconium dichloride, diphenylmethylene(2,3,4,5-tetraphenyl-1-cyclopentadienyl)(2,7-di-tert-butyl-9-fluorenyl)zirconium dichloride, diphenylmethylene(2-trimethylsilyl-1-cyclopentadienyl)(2,7-di-tert-butyl-9-fluorenyl)zirconium dichloride, diphenylmethylene(3-trimethylsilyl-1-cyclopentadienyl)(2,7-di-tert-butyl-9-fluorenyl)zirconium dichloride, diphenylmethylene(2,4-bis(trimethylsilyl)-1-cyclopentadienyl)(2,7-di-tert-butyl-9-fluorenyl)zirconium dichloride, diphenylmethylene(2,5-bis(trimethylsilyl)-1-cyclopentadienyl)(2,7-di-tert-butyl-9-fluorenyl)zirconium dichloride, diphenylmethylene(3,4-bis(trimethylsilyl)-1-cyclopentadienyl)(2,7-di-tert-butyl-9-fluorenyl)zirconium dichloride, diphenylmethylene(2,3,4-tris(trimethylsilyl)-1-cyclopentadienyl)(2,7-di-tert-butyl-9-fluorenyl)zirconium dichloride, diphenylmethylene(2,3,5-tris(trimethylsilyl)-1-cyclopentadienyl)(2,7-di-tert-butyl-9-fluorenyl)zirconium dichloride, diphenylmethylene(3,4,5-tris(trimethylsilyl)-1-cyclopentadienyl)(2,7-di-tert-butyl-9-fluorenyl)zirconium dichloride, and diphenylmethylene(2,3,4,5-tetrakis(trimethylsilyl)-1-cyclopentadienyl)(2,7-di-tert-butyl-9-fluorenyl)zirconium dichloride.

Further examples include compounds resulting from changing the dichloride $X^2$ of the above-disclosed transition metal compounds to difluoride, dibromide, diiodide, dimethyl, diethyl, diisopropyl, dimethoxide, diethoxide, dipropoxide, dibutoxide, bis(trifluoromethoxide), diphenyl, diphenoxide, bis(2,6-di-tert-butylphenoxide), bis(3,4,5-trifluorophenoxide), bis(pentafluorophenoxide), bis(2,3,5,6-tetrafluoro-4-pentafluorophenyl phenoxide), dibenzyl, etc. Still further examples include compounds resulting from changing the diphenylmethylene group of the bridging group $[-J^2\,(R^5)_2)_n-]$ of the above-disclosed transition metal compounds to a methylene group, an ethylene group, an isopropylidene group, a methylphenylmethylene group, a dimethylsilanediyl group, a diphenylsilanediyl group, a silacyclobutanediyl group, a silacyclohexanediyl group, etc.

Further examples include compounds resulting from changing the zirconium of $M^2$ of the above-disclosed transition metal compounds to titanium or hafnium.

Preferred as the transition metal compound of component (B2) represented by formula (2) is diphenylmethylene(1-cyclopentadienyl)(9-fluorenyl)zirconium dichloride.

Component (C) is the above-mentioned component (C-1) and/or the above-mentioned component (C-2).

Component (C-1) is a solid state catalyst component that is formed by bringing the above-mentioned component (a) and the above-mentioned component (b) into contact with each other.

The organometallic compound of Group 13 of the periodic table of the elements of component (a-1) to be used for component (a) is preferably an organoaluminum compound. Examples of such an organoaluminum compound include trialkylaluminums, dialkylaluminum chlorides, alkylaluminum dichlorides, dialkylaluminum hydrides, alkyl(dialkoxy) aluminums, dialkyl(alkoxy)aluminums, alkyl(diaryloxy)aluminums, and dialkyl(aryloxy)aluminums.

Examples of such trialkylaluminiums include trimethylaluminum, triethylaluminum, tri-n-propylaluminum, tri-n-butylaluminum, triisobutylaluminum, tri-n-hexylaluminum, and tri-n-octylaluminum.

Examples of such dialkylaluminum chlorides include dimethylaluminum chloride, diethylaluminum chloride, di-n-propylaluminum chloride, di-n-butylaluminum chloride, diisobutylaluminum chloride, and di-n-hexylaluminum chloride.

Examples of such alkylaluminum dichloride include methylaluminum dichloride, ethylaluminum dichloride, n-propylaluminum dichloride, n-butylaluminum dichloride, isobutylaluminum dichloride, and n-hexylaluminum dichloride.

Examples of such dialkylaluminum hydrides include dimethylaluminum hydride, diethylaluminum hydride, di-n-propylaluminum hydride, di-n-butylaluminum hydride, diisobutylaluminum hydride, and di-n-hexylaluminum hydride.

Examples of such alkyl(dialkoxy)aluminums include methyl(dimethoxy)aluminum, methyl(diethoxy)aluminum, and methyl(di-tert-butoxy)aluminum.

Examples of such dialkyl(alkoxy)aluminum include dimethyl(methoxy)aluminum, dimethyl(ethoxy)aluminum, and methyl(tert-butoxy)aluminum.

Examples of such alkyl(diaryloxy)aluminum include methyl(diphenoxy)aluminum, methylbis(2,6-diisopropylphenoxy)aluminum, and methylbis(2,6-diphenylphenoxy) aluminum.

Examples of such dialkyl(aryloxy)aluminum include dimethyl(phenoxy)aluminum, dimethyl(2,6-diisopropylphenoxy)aluminum, and dimethyl(2,6-diphenylphenoxy)aluminum.

As to such organoaluminum compounds, a single species may be used alone or two or more species may be used in combination.

As such organoaluminum compounds, preferred are trialkylaluminums, more preferred is trimethylaluminum, triethylaluminum, tri-n-butylaluminum, triisobutylaluminum, tri-n-hexylaluminum, or tri-n-octylaluminum, and even more preferred is triisobutylaluminum or tri-n-octylaluminum.

Examples of the organoaluminumoxy compound of a component (a-2) to be used for component (a) include cyclic aluminoxanes represented by the following formula [1] and linear aluminoxanes represented by the following formula [2]:

$$\{-Al(R^6)-O-\}_1 \qquad [1]$$

wherein $R^6$ represents a hydrocarbon group, and the $R^6$ groups may be the same or different; and i represents an integer of 2 or more,

 [2]

wherein $R^7$ represents a hydrocarbon group, and the $R^7$ groups may be the same or different; and j represents an integer of 1 or more.

As the hydrocarbon groups of $R^6$ in formula [1] and $R^7$ in formula [2], preferred are hydrocarbon groups having 1 to 8 carbon atoms, and more preferred are alkyl groups having from 1 to 8 carbon atoms. Examples of such alkyl groups having from 1 to 8 carbon atoms include a methyl group, an ethyl group, a n-propyl group, an isopropyl group, a n-butyl group, an isobutyl group, n-pentyl group, and a neopentyl group, and preferred is a methyl group or an isobutyl group.

The i in formula [1] is preferably an integer of 2 to 40, and the j in formula [2] is preferably an integer of 1 to 40.

The cyclic aluminoxanes represented by formula [1] and the linear aluminoxanes represented by formula [2] can be produced by various methods. Such production methods are not particularly restricted and may be conventional production methods. Examples of such production methods include a method in which the production is done by bringing a solution in which a trialkylaluminum such as trimethylaluminum has been dissolved in a proper organic solvent, such as benzene and aliphatic hydrocarbons, into contact with water, and a method in which the production is done by bringing a trialkylaluminum such as trimethylaluminum into contact with a metal salt containing water of crystallization such as copper sulfate hydrate. As to such organoaluminumoxy compounds, a single species may be used alone or two or more species may be used in combination. Preferred are organoaluminumoxy compounds prepared from trimethylaluminum or triisobutylaluminum.

As component (a-3) boron compound to be used for component (a), one or more boron compounds selected from (c-1) boron compounds represented by formula $BQ^1Q^2Q^3$, (c-2) boron compounds represented by formula $G^+ (BQ^1Q^2Q^3Q^4)^-$ and (C-3) boron compounds represented by formula $(L-H)^+ (BQ^1Q^2Q^3Q^4)^-$ are used.

In (c-1) the boron compounds represented by formula $BQ^1Q^2Q^3$, B is a trivalent boron atom, and $Q^1$ through $Q^3$ are a halogen atom, a hydrocarbon group, a halogenated hydrocarbon group, a substituted silyl group, an alkoxy group, or a di-substituted amino group and they may be the same or different. Preferably, $Q^1$ through $Q^3$ are a halogen atom, a hydrocarbon group having 1 to 20 carbon atoms, a halogenated hydrocarbon group having 1 to 20 carbon atoms, a substituted silyl group having 1 to 20 carbon atoms, an alkoxy group having 1 to 20 carbon atoms, or an amino group having 2 to 20 carbon atoms, and $Q^1$ through $Q^3$ are more preferably a halogen atom, a hydrocarbon group having 1 to 20 carbon atoms, or a halogenated hydrocarbon group having 1 to 20 carbon atoms.

More preferably, $Q^1$ through $Q^4$ are each a fluorinated hydrocarbon group having 1 to 20 carbon atoms containing at least one fluorine atom, and particularly preferably $Q^1$ through $Q^4$ are each a fluorinated aryl group having 6 to 20 carbon atoms containing at least fluorine atom.

Specific examples of compound (c-1) include tris(pentafluorophenyl)borane, tris(2,3,5,6-tetrafluorophenyl)borane, tris(2,3,4,5-tetrafluorophenyl)borane, tris(3,4,5-trifluorophenyl)borane, tris(2,3,4-trifluorophenyl)borane, and phenylbis(pentafluorophenyl)borane, and most preferred is tris(pentafluorophenyl)borane.

In the boron compound (c-2) of formula $G^+ (BQ^1Q^2Q^3Q^4)^-$, $G^+$ is an inorganic or organic cation, B is a trivalent boron atom, and $Q^1$ through $Q^4$ are as defined for $Q^1$ through $Q^3$ in the aforementioned (c-1).

Specific examples of the inorganic cation $G^+$ in the compound represented by formula $G^+ (BQ^1Q^2Q^3Q^4)^-$ include a ferrocenium cation, alkyl-substituted ferrocenium cations, and silver cation, and specific examples of the organic cation $G^+$ include a triphenylmethyl cation. Preferred as $G^+$ are carbenium cations, and particularly preferred is a triphenylmethyl cation. Examples of $(BQ^1Q^2Q^3Q^4)^-$ include tetrakis(pentafluorophenyl)borate, tetrakis(2,3,5,6-tetrafluorophenyl)borate, tetrakis(2,3,4,5-tetrafluorophenyl)borate, tetrakis(3,4,5-trifluorophenyl)borate, tetrakis(2,3,4-trifluorophenyl)borate, phenyltris(pentafluorophenyl)borate, and tetrakis(3,5-bis-trifluoromethylphenyl)borate.

Specific combinations thereof include ferrocenium tetrakis(pentafluorophenyl)borate, 1,1'-dimethylferrocenium tetrakis(pentafluorophenyl)borate, silver tetrakis(pentafluorophenyl)borate, tripheylmethyltetrakis(pentafluorophenyl)borate, and triphenylmethyltetrakis(3,5-bistrifluoromethylphenyl)borate; most preferred is triphenylmethyltetrakis(pentafluorophenyl)borate.

In the boron compound (c-3) of formula $(L-H)^+ (BQ^1Q^2Q^3Q^4)^-$, L is a neutral Lewis base and $(L-H)^+$ is a Bronsted acid, B is a trivalent boron atom, and $Q^1$ through $Q^4$ are as defined for $Q^1$ through $Q^3$ in the aforementioned Lewis acid (c-1).

Specific examples of the Bronsted acid $(L-H)^+$ in the compound represented by formula $(L-H)^+ (BQ^1Q^2Q^3Q^4)^-$ include trialkyl-substituted ammoniums, N,N-dialkylaniliniums, dialkylammoniums, and triarylphosphoniums, and as $(BQ^1Q^2Q^3Q^4)^-$, the same ions as described above are listed.

Examples of specific combinations thereof include triethylammonium tetrakis(pentafluorophenyl)borate, tripropylammoniumtetrakis(pentafluorophenyl)borate, tri(n-butyl)ammonium tetrakis(pentafluorophenyl)borate, tri(n-butyl) ammonium tetrakis(3,5-bis-trifluoromethylphenyl)borate, N,N-dimethylanilinium tetrakis(pentafluorophenyl)borate, N,N-diethylanilinium tetrakis(pentafluorophenyl)borate, N,N-2,4,6-pentamethylanilinium tetrakis(pentafluorophenyl)borate, N,N-dimethylanilinium tetrakis(3,5-bis-trifluoromethylphenyl)borate, diisopropylammonium tetrakis(pentafluorophenyl)borate, dicyclohexylammonium tetrakis(pentafluorophenyl)borate, triphenylphosphonium tetrakis(pentafluorophenyl)borate, tri(methylphenyl)phosphonium tetrakis(pentafluorophenyl)borate, and tri(dimethylphenyl) phosphonium tetrakis(pentafluorophenyl)borate; most preferred is tri(n-butyl)ammonium tetrakis(pentafluorophenyl) borate or N,N-dimethylanilinium tetrakis(pentafluorophenyl)borate.

As component (a), preferred is the organoaluminumoxy compound of component (a-2).

The solid state carrier to be used for component (b) is an inorganic or organic compound in the form of granular or fine particulate solid, and the components described above have been supported on a solid state carrier described below.

Examples of the inorganic compounds include porous oxides, inorganic chlorides, clays, clay minerals or ion-exchanging layered compounds; preferably, porous oxides or inorganic chlorides described below can be used.

As the porous oxides, $SiO_2$, $Al_2O_3$, MgO, ZrO, $TiO_2$, $B_2O_3$, CaO, ZnO, BaO, $ThO_2$, and complexes and mixtures containing such oxides can be used; for example, natural or synthetic zeolites, $SiO_2$—MgO, $SiO_2$—$Al_2O_3$, $SiO_2$—$TiO_2$, $SiO_2$—$V_2O_5$, $SiO_2$—$Cr_2O_3$, and $SiO_2$—$TiO_2$—MgO can be used. Of these, those containing $SiO_2$ as the major component are preferred.

The inorganic oxides may contain small amounts of carbonate, sulfate, nitrate or oxide components such as $Na_2CO_3$, $K_2CO_3$, $CaCO_3$, $MgCO_3$, $Na_2SO_4$, $Al_2(SO_4)_3$, $BaSO_4KNO_3$, $Mg(NO_3)_2$, $Al(NO_3)_3$, $Na_2O$, $K_2O$, and $Li_2O$.

Although such porous oxides have various properties depending on the type and preparation process thereof, the carrier suitable for use in the invention has a particle diameter of 0.2 to 300 μm, preferably 1 to 200 μm, a specific surface area within the range of 50 to 1200 m²/g, preferably 100 to 1000 m²/g, and desirably has a pore volume within the range of 0.3 to 30 cm³/g. Such a carrier is used after, according to need, being baked at 100 to 1000° C., and preferably 150 to 700° C.

As said inorganic chlorides, $MgCl_2$, $MgBr_2$, $MnCl_2$, $MnBr_2$ and so on are used. The inorganic chlorides may be used as received or after being pulverized with a ball mill, a vibration mill, or the like. Alternatively, it is also permitted to use one prepared by dissolving an inorganic chlorides in a solvent such as alcohol and then precipitating it into the form of fine particles with a precipitating agent.

The clays for use in the present invention are generally composed of a clay mineral as the major component. The ion-exchanging layered compounds for use in the present invention are compounds that have a crystal structure in which planes formed by ionic bonding or the like are piled on one another in parallel with a weak bond strength, ion contained therein being exchangeable. Most clay minerals are ion-exchanging layered compounds. The clays, the clay minerals and the ion-exchanging layered compounds are not limited to naturally occurring materials and synthetic ones may also be used.

Examples of such clays, clay minerals and ion-exchanging layered compounds include clays, clay minerals, and ion crystalline compounds having such a layered crystal structure as a hexagonal closest packing type, an antimony type, a $CdCl_2$ type, and a $CdI_2$ type.

Examples of such clays and clay minerals include kaolin, bentonite, kibushi clay, potter's clay, allophane, hisingerite, pyrophyllite, mica group, montmorillonite group, vermiculite, chlorite group, palygorskite, kaolinite, nacrite, dickite, and halloysite; examples of such ion-exchanging layered compounds include crystalline acid salts of polyvalent metals, such as α-Zr $(HAsO_4)_2.H_2O$, α-Zr $(HPO_4)_2$, α-Zr $(KPO_4)_2.3H_2O$, α-Ti $(HPO_4)_2$, α-Ti$(HAsO_4)_2.H_2O$, α-Sn $(HPO_4)_2.H_2O$, γ-Zr $(HPO_4)_2$, γ-Ti$(HPO_4)_2$, and γ-Ti $(NH_4PO_4)_2.H_2O$.

Such clays, clay minerals and ion-exchanging layered compounds are preferably those having a volume of pores having a radius of not less than 20 Å by the mercury penetration method of 0.1 cc/g or more, particularly from 0.3 to 5 cc/g. The pore volume is measured for the range of pore diameter of from 20 to 3×104 Å by the mercury penetration method using a mercury porosimeter.

When a material having a volume of pores not smaller than 20 Å in radius of less than 0.1 cc/g is used as a carrier, it tends to be difficult to obtain high polymerization activity.

It is preferable to apply chemical treatment to the clays and the clay minerals for use in the present invention. Any chemical treatment may be used, for example, a surface treatment to remove impurities attached to the surface or a treatment to affect the crystal structure of the clay. Specific examples of such chemical treatment include acid treatment, alkali treatment, salt treatment, and organic matter treatment. The acid treatment removes impurities from the surface and increases the surface area by dissolving cations such as those of Al, Fe and Mg contained in the crystal structure. The alkali treatment destroys the crystal structure of the clay to cause change in the structure of the clay. The salt treatment and the organic matter treatment produce an ionic complex, a molecular complex, an organic derivative, or the like to cause change in surface area or interlayer distance.

The ion-exchanging layered compound to be used in the present invention may be a layered compound enlarged in interlayer distance by exchanging the exchangeable ions located between layers with other larger and bulkier ions by utilizing ion exchange properties. Such bulkier ions play a pillar-like role to support the layered structure and are generally called pillars. Such introduction of other substances to between layers of a layered compound is called intercalation. Examples of guest compounds to be intercalated include cationic inorganic compounds such as $TiCl_4$ and $ZrCl_4$; metal alkoxides such as $Ti(OR)_4$, $Zr(OR)_4$, $PO(OR)_3$, and $B(OR)_3$ (R is a hydrocarbon group or the like); and metal hydroxide ions such as $[Al_{13}O_4(OH)_{24}]^{7+}$, $[Zr_4(OH)_{14}]^{2+}$, and $[Fe_3O(OCOCH)_6]^+$. These compounds may be used singly or two or more species thereof may be used in combination. Intercalation of such compounds can be carried out in the presence of polymers obtained by the hydrolysis of metal alkoxides such as $Si(OR)_4$, $Al(OR)_3$, and $Ge(OR)_4$ (R is a hydrocarbon group or the like) or in the presence of colloidal inorganic compounds such as $SiO_2$. Examples of such pillars include oxides resulting from thermal dehydration of the above-mentioned metal hydroxide ions have been intercalated to between layers.

The clays, clay minerals, and ion-exchanging layered compounds for use in the present invention may be used as received or after being treated, for example, by ball milling or sieving. They may be used after being subjected to water adsorption or thermal dehydration. They may be used singly or two or more species thereof may be used in combination.

Of these, the clays and the clay minerals are preferred, and montmorillonite, vermiculite, pectolite, tenorite, and synthetic mica are particularly preferred.

The organic compound is, for example, a granular or fine particulate solid ranging in particle diameter from 10 to 300 μm. Specific examples thereof include (co)polymers mainly composed of an olefin having 2 to 14 carbon atoms such as ethylene, propylene, 1-butene or 4-methyl-1-pentene, (co)polymers mainly composed of vinylcyclohexane or styrene, and modified products thereof.

When component (a) and component (b) are brought into contact together, the reaction site in the component (a) and the reaction site in the component (b) react with each other to form a chemical bond, resulting in a contact product between the component (a) and the component (b). The time of the contact of the component (a) and the component (b) is usually up to 20 hours, and preferably up to 10 hours and the contact temperature is usually from −50 to 200° C., and preferably from −20 to 120° C. If the initial contact between the components (a) and (b) takes place precipitously, the reaction heat or reaction energy breaks the component (b) to cause a deteriorated morphology of the obtainable solid state catalyst component, and the use of such a component in polymerization will result in difficulty in continuous operation due to bad morphology of the polymer. Thus, the initial contact of the components (a) and (b) is preferably performed at a low temperature or the components are caused to react together slowly to avoid the generation of reaction heat. The molar ratio in contacting the components (a) and (b), (component (a)/component (b)), may be selected arbitrarily, but it is preferable to use a higher molar ratio because the combined amount of components (B1) and (B2) to be brought into contact together can thereby be increased, resulting in improved activity of the solid state catalyst component.

The molar ratio of the component (a) to the component (b) [=molar amount of component (a)/molar amount of component (b)] is usually from 0.2 to 2.0, and particularly preferably from 0.4 to 2.0.

Component (C-1) is preferably a solid state catalyst component formed by bringing an organoaluminumoxy compound and silica into contact with each other and more preferably is a solid state catalyst component formed by bringing a cyclic aluminoxane represented by the above formula [1] or a linear aluminoxane represented by the above formula [2] and silica into contact with each other.

Component (C-2) is a modified clay mineral formed by bringing an organic compound and a clay mineral into contact with each other. Examples of such a clay mineral include those that have been provided as examples of the clay mineral of the above-described component (b).

Examples of the organic compound to be used for the component (C-2) include compounds represented by the following formula [3], the following formula [4], or the following formula [5]. Of these, preferred are the compounds represented by the following formula [3].

$$[R^8R^9_{x-1}M^3H]_{m1}[A^1]_{n1} \quad [3]$$

wherein [$A^1$] represents an anion, [$R^8R^9_{x-1}M^3H$] represents a cation, $M^3$ represents an atom of Group 15 or Group 16 of the periodic table of the elements, $R^8$ represents a hydrocarbon group, and $R^9$ each independently represents a hydrogen atom or a hydrocarbon group; x represents 3 when $M^3$ is an element of Group 15 and it represents 2 when $M^3$ is an element of Group 16; m1 and n1 represent integers selected so that charges might be balanced.

$$[C]_{m2}[A^2]_{n2} \quad [4]$$

wherein [$A^2$] represents an anion and [C] represents a carbonium cation or a tropylium cation; m2 and n2 represent integers selected so that charges might be balanced.

$$[M^4L^3_y]_{m3}[A^3]_{n3} \quad [5]$$

wherein [$A^3$] represents an anion, $M^4$ represents a cation of a lithium atom, an iron atom, or a silver atom, and $L^3$ each independently represents a Lewis base or a substituted or non-substituted cyclopentadienyl group; y represents $0 \le y \le 2$; m3 and n3 represent integers selected so that charges might be balanced.

Examples of the anion of $A^1$ through $A^3$ include a fluorine ion, a chlorine ion, a bromine ion, an iodine ion, a sulfate ion, a nitrate ion, a phosphate ion, a perchlorate ion, an oxalate ion, a citrate ion, a succinate ion, a tetrafluoroborate ion, and a hexafluorophosphate ion.

Examples of the atom of $M^3$ of Group 15 of the periodic table of the elements include a nitrogen atom and a phosphorus atom. Examples of the atom of $M^3$ of Group 16 of the periodic table of the elements include an oxygen atom and a sulfur atom.

As the hydrocarbon groups of $R^8$ and $R^9$ of $M^3$, preferred are hydrocarbon groups having 1 to 20 carbon atoms. Examples of said hydrocarbon groups having 1 to 20 carbon atoms include a methyl group, an ethyl group, a n-propyl group, an isopropyl group, an allyl group, a n-butyl group, an isobutyl group, a sec-butyl group, a tert-butyl group, a n-pentyl group, an isopentyl group, a 2-methylbutyl group, a 1-methylbutyl group, a 1-ethylpropyl group, a neopentyl group, a tert-pentyl group, a cyclopentyl group, a n-hexyl group, an isohexyl group, a 3-methylpentyl group, a 4-methylpentyl group, a neohexyl group, a 2,3-dimethylbutyl group, a 2,2-dimethylbutyl group, a 4-methyl-2-pentyl, a 3,3-dimethyl-2-butyl group, a 1,1-dimethylbutyl group, a 2,3-dimethyl-2-butyl group, a cyclohexyl group, a n-heptyl group, a cycloheptyl group, a 2-methylcyclohexyl group, a 3-methylcyclohexyl group, a 4-methylcyclohexyl group, a n-octyl group, an isooctyl group, a 1,5-dimethylhexyl group, a 1-methylheptyl group, a 2-ethylhexyl group, a tert-octyl group, a 2,3-dimethylcyclohexyl group, a 2-(1-cyclohexenyl)ethyl group, a n-nonyl group, a n-decyl group, an isodecyl group, a geranyl group, a n-undecyl group, a n-dodecyl group, a cyclododecyl group, a n-tridecyl group, a n-tetradecyl group, a n-pentadecyl group, a n-hexadecyl group, a n-heptadecyl group, a n-octadecyl group, a n-nonadecyl group, a n-eicosyl group, a n-heneicosyl group, a n-docosyl group, a n-tricosyl group, an oleyl group, a vehenyl group, a phenyl group, an o-tolyl group, a m-tolyl group, a p-tolyl group, a 2-ethylphenyl group, a 3-ethylphenyl group, a 4-ethylphenyl group, a 3-isopropylphenyl group, a 2-isopropylphenyl group, a 4-isopropylphenyl group, a 2-tert-butylphenyl group, a 4-n-butylphenyl group, a 4-sec-butylphenyl group, a 4-tert-butylphenyl group, a 2,3-xylyl group, a 2,4-xylyl group, a 2,5-xylyl group, a 2,6-xylyl group, a 3,4-xylyl group, a 3,5-xylyl group, a 2,6-diethylphenyl group, a 2-isopropyl-6-methylphenyl group, a 2-chlorophenyl group, a 3-chlorophenyl group, a 4-chlorophenyl group, a 2-bromophenyl group, a 3-bromophenyl group, a 4-bromophenyl group, a 2-methoxyphenyl group, a 3-methoxyphenyl group, a 4-methoxyphenyl group, a 2-ethoxyphenyl group, a 3-ethoxyphenyl group, a 4-ethoxyphenyl group, a 1-naphthyl group, a 2-naphthyl group, a 1-fluorenyl group, a 2-fluorenyl group, a 3-fluorenyl group, a 4-fluorenyl group, a 2,3-dihydroinden-5-yl group, a 2-biphenyl group, a 4-biphenyl group, and a p-trimethylsilylphenyl group. $R^8$ and $R^9$ may be combined together.

Among the compounds represented by the above formula [3], examples of compounds with $M^3$ being a nitrogen atom include aliphatic amine hydrochlorides such as methylamine hydrochloride, ethylamine hydrochloride, n-propylamine hydrochloride, isopropylamine hydrochloride, n-butylamine hydrochloride, isobutylamine hydrochloride, tert-butylamine hydrochloride, n-pentylamine hydrochloride, isopentylamine hydrochloride, 2-methylbutylamine hydrochloride, neopentylamine hydrochloride, tert-pentylamine hydrochloride, n-hexylamine hydrochloride, isohexylamine hydrochloride, n-heptylamine hydrochloride, n-octylamine hydrochloride, n-nonylamine hydrochloride, n-decylamine hydrochloride, n-undecylamine hydrochloride, n-dodecylamine hydrochloride, n-tetradecylamine hydrochloride, n-hexadecylamine hydrochloride, n-octadecylamine hydrochloride, allylamine hydrochloride, cyclopentylamine hydrochloride, dimethylamine hydrochloride, diethylamine hydrochloride, diallylamine hydrochloride, trimethylamine hydrochloride, tri-n-butylamine hydrochloride, triallylamine hydrochloride, hexylamine hydrochloride, 2-aminoheptane hydrochloride, 3-aminoheptane hydrochloride, n-heptylamine hydrochloride, 1,5-dimethylhexylamine hydrochloride, 1-methylheptylamine hydrochloride, n-octylamine hydrochloride, tert-octylamine hydrochloride, nonylamine hydrochloride, decylamine hydrochloride, undecylamine hydrochloride, dodecylamine hydrochloride, tridecylamine hydrochloride, tetradecylamine hydrochloride, pentadecylamine hydrochloride, hexadecylamine hydrochloride, heptadecylamine hydrochloride, octadecylamine hydrochloride, nonadecylamine hydrochloride, cyclohexylamine hydrochloride, cycloheptylamine hydrochloride, 2-methylcyclohexylamine hydrochloride, 3-methylcyclohexylamine hydrochloride, 4-methylcyclohexylamine hydrochloride, 2,3-dimethylcyclohexylamine hydrochloride, cyclododecylamine hydrochloride, 2-(1-cyclohexenyl)ethylamine hydrochloride, geranylamine hydrochloride, N-methylhexylamine hydrochloride, dihexylamine hydrochloride, bis(2-ethylhexyl)amine hydrochloride, dioctylamine hydrochloride, didecylamine hydrochloride, N-methylcyclohexylamine hydrochloride, N-ethylcyclohexylamine hydrochloride, N-isopropylcyclohexylamine hydrochloride, N-tert-butylcyclohexylamine hydrochloride, N-allylcyclohexylamine hydrochloride, N,N-dimethyloctylamine hydrochloride, N,N-dimethylundecylamine hydrochloride, N,N-dimethyldodecylamine hydrochloride, N,N-dimethyl-n-tetradecylamine hydrochloride, N,N-dimethyl-n-hexadecylamine hydrochloride, N,N-dimethyl-n-octadecylamine hydrochloride, N,N-dimethyl-n-eicosylamine hydrochloride, N,N-dimethyl-n-docosylamine hydrochloride, N,N-dimethyloleylamine hydrochloride, N,N-dimethyl-vehenylamine hydrochloride, trihexylamine hydrochloride, triisooctylamine hydrochloride, trioctylamine hydrochloride, triisodecylamine hydrochloride, tridodecylamine hydrochloride, N-methyl-N-octadecyl-1-octadecylamine hydrochloride, N,N-dimethylcyclohexylamine hydrochloride, N,N-dimethylcyclohexylmethylamine hydrochloride, N,N-diethylcyclohexylamine hydrochloride, pyrrolidine hydrochloride, piperidine hydrochloride, 2,5-dimethylpyrrolidine hydrochloride, 2-methylpiperidine hydrochloride, 3-methylpiperidine hydrochloride, 4-methylpiperidine hydrochloride, 2,6-dimethylpiperidine hydrochloride, 3,3-dimethylpiperidine hydrochloride, 3,5-dimethylpiperidine hydrochloride, 2-ethylpiperidine hydrochloride, 2,2,6,6-tetramethylpiperidine hydrochloride, 1-methylpyrrolidine hydrochloride, 1-methylpiperidine hydrochloride, 1-ethylpiperidine hydrochloride, 1-butylpyrrolidine hydrochloride and 1,2,2,6,6-pentamethylpiperidine hydrochloride; aromatic amine hydrochlorides such as aniline hydrochloride, N-methylaniline hydrochloride, N-ethylaniline hydrochloride, N-allylaniline hydrochloride, o-toluidine hydrochloride, m-toluidine hydrochloride, p-toluidine hydrochloride, N,N-dimethylaniline hydrochloride, N-methyl-o-toluidine hydrochloride, N-methyl-m-toluidine hydrochloride, N-methyl-p-toluidine hydrochloride, N-ethyl-o-toluidine hydrochloride, N-ethyl-m-toluidine hydrochloride, N-ethyl-p-toluidine hydrochloride, N-allyl-o-toluidine hydrochloride, N-allyl-m-toluidine hydrochloride, N-allyl-p-toluidine hydrochloride, N-propyl-o-toluidine hydrochloride, N-propyl-m-toluidine hydrochloride, N-propyl-p-toluidine hydrochloride, 2,3-dimethylaniline hydrochloride, 2,4-dimethylaniline hydrochloride, 2,5-dimethylaniline hydrochloride, 2,6-dimethylaniline hydrochloride, 3,4-dimethylaniline hydrochloride, 3,5-dimethylaniline hydrochloride, 2-ethylaniline hydrochloride, 3-ethylaniline hydrochloride, 4-ethylaniline hydrochloride, N,N-diethylaniline hydrochloride, 2-isopropylaniline hydrochloride, 4-isopropylaniline hydrochloride, 2-tert-butylaniline hydrochloride, 4-n-butylaniline hydrochloride, 4-sec-butylaniline hydrochloride, 4-tert-butylaniline hydrochloride, 2,6-diethylaniline hydrochloride, 2-isopropyl-6-methylaniline hydrochloride, 2-chloroaniline hydrochloride, 3-chloroaniline hydrochloride, 4-chloroaniline hydrochloride, 2-bromoaniline hydrochloride, 3-bromoaniline hydrochloride, 4-bromoaniline hydrochloride, o-anisidine hydrochloride, m-anisidine hydrochloride, p-anisidine hydrochloride, o-phenetidine hydrochloride, m-phenetidine hydrochloride, p-phenetidine hydrochloride, 1-aminonaphthalene hydrochloride, 2-aminonaphthalene hydrochloride, 1-aminofluorene hydrochloride, 2-aminofluorene hydrochloride, 3-aminofluorene hydrochloride, 4-aminofluorene hydrochloride, 5-aminoindane hydrochloride, 2-aminobiphenyl hydrochloride, 4-aminobiphenyl hydrochloride, N,2,3-trimethylaniline hydrochloride, N,2,4-trimethylaniline hydrochloride, N,2,5-trimethylaniline hydrochloride, N,2,6-trimethylaniline hydrochloride, N, 3,4-trimethylaniline hydrochloride, N,3,5-trimethylaniline hydrochloride, N-methyl-2-ethylaniline hydrochloride, N-methyl-3-ethylaniline hydrochloride, N-methyl-4-ethylaniline hydrochloride, N-methyl-6-ethyl-o-toluidine hydrochloride, N-methyl-2-isopropylaniline hydrochloride, N-methyl-4-isopropylaniline hydrochloride, N-methyl-2-tert-butylaniline hydrochloride, N-methyl-4-n-butylaniline hydrochloride, N-methyl-4-sec-butylaniline hydrochloride, N-methyl-4-tert-butylaniline hydrochloride, N-methyl-2,6-diethylaniline hydrochloride, N-methyl-2-isopropyl-6-methylaniline hydrochloride, N-methyl-p-anisidine hydrochloride, N-ethyl-2,3-anisidine hydrochloride, N,N-dimethyl-o-toluidine hydrochloride, N,N-dimethyl-m-toluidine hydrochloride, N,N-dimethyl-p-toluidine hydrochloride, N,N,2,3-tetramethylaniline hydrochloride, N,N,2,4-tetramethylaniline hydrochloride, N,N,2,5-tetramethylaniline hydrochloride, N,N,2,6-tetramethylaniline hydrochloride, N,N,3,4-tetramethylaniline hydrochloride, N,N,3,5-tetramethylaniline hydrochloride, N,N-dimethyl-2-ethylaniline hydrochloride, N,N-dimethyl-3-ethylaniline hydrochloride, N,N-dimethyl-4-ethylaniline hydrochloride, N,N-dimethyl-6-ethyl-o-toluidine hydrochloride, N,N-dimethyl-2-isopropylaniline hydrochloride, N,N-dimethyl-4-isopropylaniline hydrochloride, N,N-dimethyl-2-tert-butylaniline hydrochloride, N,N-dimethyl-4-n-butylaniline hydrochloride, N,N-dimethyl-4-sec-butylaniline hydrochloride, N,N-dimethyl-4-tert-butylaniline hydrochloride, N,N-dimethyl-2,6-diethylaniline hydrochloride, N,N-dimethyl-2-isopropyl-6-methylaniline hydrochloride, N,N-dimethyl-2-chloroaniline hydrochloride, N,N-dimethyl-3-chloroaniline hydrochloride, N,N-dimethyl-4-chloroaniline hydrochloride, N,N-dimethyl-2-bromoaniline hydrochloride, N,N-dimethyl-3-bromoaniline hydrochloride, N,N-dimethyl-4-bromoaniline hydrochloride, N,N-dimethyl-o-anisidine hydrochloride, N,N-dimethyl-m-anisidine hydrochloride, N,N-dimethyl-p-anisidine hydrochloride, N,N-dimethyl-o-phenetidine hydrochloride, N,N-dimethyl-m-phenetidine hydrochloride, N,N-dimethyl-p-phenetidine hydrochloride, N,N-dimethyl-1-aminonaphthalene hydrochloride, N,N-dimethyl-2-aminonaphthalene hydrochloride, N,N-dimethyl-1-aminofluorene hydrochloride, N,N-dimethyl-2-aminofluorene hydrochloride, N,N-dimethyl-3-aminofluorene hydrochloride, N,N-dimethyl-4-aminofluorene hydrochloride, N,N-dimethyl-5-aminoindane hydrochloride, N,N-dimethyl-2-aminobiphenyl hydrochloride, N,N-dimethyl-4-aminobiphenyl hydrochloride or N,N-dimethyl-p-trimethylsilylaniline hydrochloride; and compounds in which the hydrochloride of the above compounds has been substituted with hydrofluoride, hydrobromide, hydroiodide or sulfate.

Of the compounds represented by the above formula [3], examples of the compound wherein $M^3$ is a phosphor atom include such compounds as triphenylphosphine hydrochloride, tri(o-tolyl)phosphine hydrochloride, tri(p-tolyl)phosphine hydrochloride, and trimesylphosphine hydrochloride; and compounds in which the hydrochloride of the above compounds has been substituted with hydrofluoride, hydrobromide, hydroiodide or sulfate.

Of the compounds represented by the above formula [3], examples of the compound wherein $M^3$ is an oxygen atom include such compounds as methyl ether hydrochloride, ethyl ether hydrochloride, n-butyl ether hydrochloride, tetrahydrofuran hydrochloride, and phenyl ether hydrochloride; and compounds in which the hydrochloride of the above compounds has been substituted with hydrofluoride, hydrobromide, hydroiodide or sulfate.

Of the compounds represented by the above formula [3], examples of the compound wherein $M^3$ is a sulfur atom include diethyl sulfonium fluoride, diethyl sulfonium chloride, diethyl sulfonium bromide, diethyl sulfonium iodide, dimethyl sulfonium fluoride, dimethyl sulfonium chloride, dimethyl sulfonium bromide, and dimethyl sulfonium iodide.

Examples of the compound represented by the above formula [4] include trityl bromide, trityl chloride, trityl tetrafluoroborate, trityl hexafluorophosphate, tropylium bromide, tropylium chloride, tropylium tetrafluoroborate, and tropylium hexafluorophosphate.

Examples of the Lewis base of $L^3$ include ethers, aliphatic amines, aromatic amines, and phosphines.

Examples of the compound represented by the above formula [5] include ferrocenium bromide, ferrocenium chloride, ferrocenium tetrafluoroborate, and ferrocenium hexafluorophosphate.

In the contact between the organic compound and the clay mineral in component (C-2), the contact is preferably conducted by choosing the conditions that the concentration of clay mineral is from 0.1 to 30% by weight and the contact temperature is from 0 to 150° C. The organic compound may be used by preparing as a solid and dissolving the solid in a solvent, or may be directly used by preparing a solution of the organic compound by a chemical reaction in a solvent. As to the reaction amount ratio between the clay mineral and the organic compound, it is preferable to use the organic compound in an amount equivalent or more to the exchangeable cation of the clay mineral. Examples of the contact solvent include aliphatic hydrocarbons, aromatic hydrocarbons, alcohols, ethers, halogenated hydrocarbons, ketones, and water. Examples of the aliphatic hydrocarbons include pentane, hexane, and heptane. Examples of the aromatic hydrocarbons include benzene and toluene. Examples of the alcohols include ethanol and methanol. Examples of the ethers include ethyl ether, n-dibutyl ether, tetrahydrofuran, and 1,4-dioxane. Examples of the halogenated hydrocarbons include methylene chloride, and chloroform. Examples of the ketones include acetone.

Such contact solvents may be used singly or two or more species thereof may be used in combination. Among such contact solvents, preferred is an alcohol or water.

As the component (C), preferred is a solid state catalyst component formed by bringing an organoaluminumoxy compound and silica into contact with each other or a modified clay mineral formed by bringing an organic compound and a clay mineral into contact with each other, more preferred is a solid state catalyst component formed by bringing an organoaluminumoxy compound and silica into contact with each other or a modified clay mineral formed by bringing a compound represented by the above formula [3], the above formula [4], or the above formula [5] and a clay mineral into contact with each other, even more preferred is a solid state catalyst component formed by bringing an organoaluminumoxy compound and silica into contact with each other, and particularly preferred is a solid state catalyst component formed by bringing a cyclic aluminoxane represented by the above formula [1] or a linear aluminoxane represented by the above formula [2] and silica into contact with each other.

The combined use amount of component (B1) and component (B2) relative to 1 g of component (C) is preferably $1\times10^{-6}$ to $1\times10^{-3}$ mol, and more preferably $5\times10^{-6}$ to $1\times10^{-4}$ mol.

The ethylene-α-olefin copolymer of the present invention can be produced using the following components (A) through (D). When producing the ethylene-α-olefin copolymer of the present invention using these components, the conditions under which component (B1) and component (B2) are brought into contact with component (C) is important. Component (D) may be brought into contact with the other components in any order.

In order to produce the ethylene-α-olefin copolymer of the present invention, it is necessary to bring component (81) and component (B2) into contact with component (C) in the presence of component (A). That is, component (B1) or component (B2) should not be brought into contact with component (C) in the absence of component (A).

Component (A): ethylene and/or an α-olefin, which are monomers.

Component (B1): a transition metal compound represented by the following formula (1):

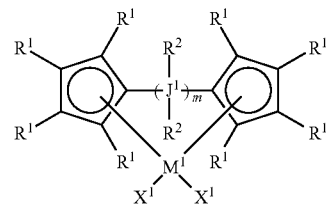

wherein $M^1$ represents a transition metal atom of Group 4 of the periodic table of the elements, $J^1$ represents an atom of Group 14 of the periodic table of the elements, m represents an integer of 1 to 5, $X^1$, $R^1$ and $R^2$ are respectively the same or different and represent a hydrogen atom, a halogen atom, an optionally substituted hydrocarbyl group having 1 to 20 carbon atoms, an optionally substituted hydrocarbyloxy group having 1 to 20 carbon atoms, a hydrocarbylsilyl group having 1 to 20 carbon atoms, or a hydrocarbylamino group having 1 to 20 carbon atoms, the $X^1$ groups may be the same or different, the $R^1$ groups may be the same or different, and the $R^2$ groups may be the same or different.

Component (B2): a transition metal compound represented by the following formula (2):

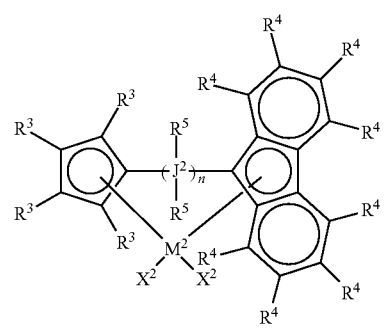

wherein $M^2$ represents a transition metal atom of Group 4 of the periodic table of the elements, $J^2$ represents an atom of Group 14 of the periodic table of the elements, n represents an integer of 1 to 5, $X^2$, $R^3$, $R^4$, and $R^5$ are respectively the same or different and represent a hydrogen atom, a halogen atom, an optionally substituted hydrocarbyl group having 1 to 20 carbon atoms, an optionally substituted hydrocarbyloxy group having 1 to 20 carbon atoms, a hydrocarbylsilyl group having 1 to 20 carbon atoms, or a hydrocarbylamino group having 1 to 20 carbon atoms, the $X^2$ groups may be the same or different, the $R^3$ groups may be the same or different, the $R^4$ groups may be the same or different, and the $R^5$ groups may be the same or different.

Component (C): the following component (C-1) and/or the following component (C-2).

Component (C-1): a solid state catalyst component that is formed by bringing the following component (a) and the following component (b) into contact with each other.

Component (a): at least one compound selected from the group consisting of (a-1) organometallic compounds of metals of Group 13 of the periodic table of the elements, (a-2) organoaluminumoxy compound, and (a-3) boron compounds.

Component (b): a solid state carrier.

Component (C-2): a modified clay mineral that is formed by bringing an organic compound and a clay mineral into contact with each other.

Component (D): an organoaluminum compound.

Specific examples of a method of bringing component (B1), component (B2), and component (C) into contact with each other in the presence of component (A) include the contact methods given below.

(1) A contact method that involves bringing components (B1) and (B2) into contact with component (C) that is in the presence of component (A).

(2) A contact method that involves bringing component (C) into contact with components (B1) and (B2) that are in the presence of component (A).

(3) A contact method that involves bringing components (B1) and (B2) that are in the presence of component (A) into contact with component (C) that is in the presence of component (A).

(4) A contact method that involves bringing component (B1) that is in the presence of component (A), component (B2) that is in the presence of component (A), and component (C) into contact with each other.

(5) A contact method that involves bringing component (B2), component (B1) that is in the presence of component (A), and component (C) that is in the presence of component (A) into contact with each other.

(6) A contact method that involves bringing component (B1), component (B2) that is in the presence of component (A), and component (C) that is in the presence of component (A) into contact with each other.

In the contact of components (A), (B1), (B2), (C), and (D), the component (D) may be brought into contact with the other components in any order; the component (D) may be brought into contact with the component (A), (B1), (B2), or (C) in advance; the component (D) may be brought into contact with the component (B1) that is in the presence of the component (A); the component (D) may be brought into contact with the component (B2) that is in the presence of the component (A); the component (D) may be brought into contact with the components (B1) and (B2) that are in the presence of the component (A); the component (D) may be brought into contact with the component (C) that is in the presence of the component (A); and the component (D) may be contact with a contact product of the components (B1), (B2), and (C) that is in the presence of the component (A).

Specifically, the following contact methods can be provided as examples.

(1) A contact method that involves bringing components (B1) and (B2) that are in the presence of component (A) into contact with component (C), and further bringing them into contact component (D).

(2) A contact method that involves bringing components (B1) and (B2) that are in the presence of component (A) into contact with component (D), and further bringing them into contact with component (C).

(3) A contact method that involves bringing component (C) that is in the presence of component (A) into contact with components (B1) and (B2), and further bringing them into contact with component (D).

(4) A contact method that involves bringing component (C) that is in the presence of component (A) into contact with component (D), and further bringing them into contact with components (B1) and (B2).

(5) A contact method that involves bringing component (D) that is in the presence of component (A) into contact with components (B1) and (B2), and further bringing them into contact with component (C).

(6) A contact method that involves bringing component (D) that is in the presence of component (A) into contact with component (C), and further bringing them into contact with components (B1) and (B2).

(7) A contact method that involves bringing a contact product of components (B1), (B2), and (D) into contact with component (C) in the presence of component (A).

(8) A contact method that involves bringing a contact product of components (C) and (D) into contact with components (B1) and (B2) in the presence of component (A).

Of these contact methods, preferred is a method in which the components (B1), (B2), and (C) are brought into contact with the component (D) that is in the presence of the component (A) in an arbitrary order like (5) or (6).

Examples of the organoaluminum compound of component (D) include trialkylaluminums, dialkylaluminum chlorides, alkylaluminum dichlorides, dialkylaluminum hydrides, alkyl(dialkoxy)aluminums, dialkyl(alkoxy)aluminums, alkyl(diaryloxy)aluminums, and dialkyl(aryloxy)aluminums.

Examples of said trialkylaluminiums include trimethylaluminum, triethylaluminum, tri-n-propylaluminum, tri-n-butylaluminum, triisobutylaluminum, tri-n-hexylaluminum, and tri-n-octylaluminum; examples of said dialkylaluminum chlorides include dimethylaluminum chloride, diethylaluminum chloride, di-n-propylaluminum chloride, di-n-butylaluminum chloride, diisobutylaluminum chloride, and di-n-hexylaluminum chloride; examples of said alkylaluminum dichlorides include methylaluminum dichloride, ethylaluminum dichloride, n-propylaluminum dichloride, n-butylaluminum dichloride, isobutylaluminum dichloride, and n-hexylaluminum dichloride; examples of said dialkylaluminum hydrides include dimethylaluminum hydride, diethylaluminum hydride, di-n-propylaluminum hydride, di-n-butylaluminum hydride, diisobutylaluminum hydride, and di-n-hexylaluminum hydride; examples of said alkyl(dialkoxy)aluminums include methyl(dimethoxy)aluminum, methyl(diethoxy)aluminum, and methyl(di-tert-butoxy)aluminum; examples of said dialkyl(alkoxy)aluminums include dimethyl(methoxy)aluminum, dimethyl(ethoxy)aluminum, and methyl(tert-butoxy)aluminum; examples of said alkyl(diaryloxy)aluminums include methyl(diphenoxy)aluminum, methylbis(2,6-diisopropylphenoxy)aluminum, and methylbis(2,6-diphenylphenoxy)aluminum; and examples of said dialkyl(aryloxy)aluminums include dimethyl(phenoxy)aluminum, dimethyl(2,6-diisopropylphenoxy)aluminum, and dimethyl(2,6-diphenylphenoxy)aluminum.

As to such organoaluminum compounds, only a single species may be used or two or more species may be used in combination.

Preferred as the organoaluminum compound are trialkylaluminiums, more preferred are trimethylaluminum, triethylaluminum, tri-n-butylaluminum, triisobutylaluminum, tri-n-hexylaluminum, and tri-n-octylaluminum, and even more preferred are triisobutylaluminum and tri-n-octylaluminum.

The amount of component (D) used, expressed by the ratio (D)/((B1)+(B2)) of the number of moles of the aluminum atoms of the organoaluminum compound of component (D) to the combined number of moles of the transition metal atoms of components (B1) and (B2), is preferably from 0.01 to 10,000, more preferably from 0.1 to 5,000, and most preferably from 1 to 2,000.

In the production of the above-described catalyst, an electron donating compound (component (E)) may be used. As such an electron donating compound, preferred are compounds containing a nitrogen atom, a phosphorus atom, an oxygen atom, or a sulfur atom, examples of which include oxygen-containing compounds, nitrogen-containing compounds, phosphorus-containing compounds, and sulfur-containing compounds, and an oxygen-containing compound or a nitrogen-containing compound is particularly preferred. Examples of such oxygen-containing compounds include alkoxysilicons, ethers, ketones, aldehydes, carboxylic acids, esters of organic acids or inorganic acids, acid amides of organic acids or inorganic acids, and acid anhydrides; alkoxysilicons or ethers are particularly preferred. Examples of such nitrogen-containing compounds include amines, nitriles, and isocyanates; amines are preferred.

Preferred as such alkoxysilicons are alkoxysilicon compounds represented by the following formula [6]:

$$R^{10}_k Si(OR^{11})_{4-k} \quad [6]$$

wherein $R^{10}$ represents a hydrocarbon group having 1 to 20 carbon atoms, a hydrogen atom, or a hetero atom-containing substituent, $R^{11}$ represents a hydrocarbon group having 1 to 20 carbon atoms, and k represents an integer that satisfies 0 k 3; wherein when there are two or more $R^{10}$ groups, the $R^{10}$ groups may be the same or different, and when there are two or more $OR^{11}$ groups, the $OR^{11}$ groups may be the same or different.

Examples of the hydrocarbon groups having 1 to 20 carbon atoms of $R^{10}$ and $R^{11}$ include linear alkyl groups such as a methyl group, an ethyl group, a propyl group, a butyl group, and a pentyl group; branched alkyl groups such as an isopropyl group, a sec-butyl group, a tert-butyl group, and a tert-amyl group; cycloalkyl groups such as a cyclopentyl group and a cyclohexyl group; cycloalkenyl groups such as a cyclopentenyl group; and aryl groups such as a phenyl group and a tolyl group.

Examples of the hetero atom of the hetero atom-containing substituent of $R^{10}$ include an oxygen atom, a nitrogen atom, sulfur atom, and a phosphorus atom. Specific examples include a dimethylamino group, a methylethylamino group, a diethylamino group, an ethyl-n-propylamino group, a di-n-propylamino group, a pyrrolyl group, a pyridyl group, a pyrrolidinyl group, a piperidyl group, a perhydroindolyl group, a perhydroisoindolyl group, a perhydroquinolyl group, a perhydroisoquinolyl group, a perhydrocarbazolyl group, a perhydroacridinyl group, a furyl group, a pyranyl group, a perhydrofuryl group, and a thienyl group. Preferably, $R^{10}$ and $R^{11}$ are alkyl groups, and more preferably, $R^{10}$ and $R^{11}$ are alkyl groups and i is 2 or 3.

Examples of said alkoxysilicons include tetramethoxysilane, methyltrimethoxysilane, ethyltrimethoxysilane, n-propyltrimethoxysilane, isopropyltrimethoxysilane, n-butyltrimethoxysilane, isobutyltrimethoxysilane, sec-butyltrimethoxysilane, tert-butyltrimethoxysilane, n-pentyltrimethoxysilane, tert-amyltrimethoxysilane, dimethyldimethoxysilane, diethyldimethoxysilane, di-n-butyldimethoxysilane, diisobutyldimethoxysilane, di-tert-butyldimethoxysilane, methylethyldimethoxysilane, methyl-n-propyldimethoxysilane, methyl-n-butyldimethoxysilane, methylisobutyldimethoxysilane, tert-butylmethyldimethoxysilane, tert-butylethyldimethoxysilane, tert-butyl-n-propyldimethoxysilane, tert-butylisopropyldimethoxysilane, tert-butyl-n-butyldimethoxysilane, tert-butylisobutyldimethoxysilane, tert-amylmethyldimethoxysilane, tert-amylethyldimethoxysilane, tert-amyl-n-propyldimethoxysilane, tert-amyl-n-butyldimethoxysilane, isobutylisopropyldimethoxysilane, dicyclobutyldimethoxysilane, cyclobutylmethyldimethoxysilane, cyclobutylethyldimethoxysilane, cyclobutylisopropyldimethoxysilane, cyclobutyl-n-butyldimethoxysilane, cyclobutylisobutyldimethoxysilane, cyclobutyl-tert-butyldimethoxysilane, dicyclopentyldimethoxysilane, cyclopentylmethyldimethoxysilane, cyclopentyl-n-propyldimethoxysilane, cyclopentylisopropyldimethoxysilane, cyclopentyl-n-butyldimethoxysilane, cyclopentylisobutyldimethoxysilane, cyclopentyl-tert-butyldimethoxysilane, dicyclohexyldimethoxysilane, cyclohexylmethyldimethoxysilane, cyclohexylethyldimethoxysilane, cyclohexyl-n-propyldimethoxysilane, cyclohexylisopropyldimethoxysilane, cyclohexyl-n-butyldimethoxysilane, cyclohexylisobutyldimethoxysilane, cyclohexyl-tert-butyldimethoxysilane, cyclohexylcyclopentyldimethoxysilane, cyclohexylphenyldimethoxysilane, diphenyldimethoxysilane, phenylmethyldimethoxysilane, phenylethyldimethoxysilane, phenyl-n-propyldimethoxysilane, phenylisopropyldimethoxysilane, phenyl-n-butyldimethoxysilane, phenylisobutyldimethoxysilane, phenyl-tert-butyldimethoxysilane, phenylcyclopentyldimethoxysilane, 2-norbornanemethyldimethoxysilane, bis(perhydroquinolino)dimethoxysilane, bis(perhydroisoquinolino)dimethoxysilane, (perhydroquinolino)(perhydroisoquinolino)dimethoxysilane, (perhydroquinolino)methyldimethoxysilane, (perhydroisoquinolino)methyldimethoxysilane, (perhydroquinolino)ethyldimethoxysilane, (perhydroisoquinolino)ethyldimethoxysilane, (perhydroquinolino)(n-propyl)dimethoxysilane, (perhydroisoquinolino)(n-propyl)dimethoxysilane, (perhydroquinolino)(tert-butyl)dimethoxysilane, (perhydroisoquinolino)(tert-butyl)dimethoxysilane, trimethylmethoxysilane, triethylmethoxysilane, tri-n-propylmethoxysilane, triisopropylmethoxysilane, tri-n-butylmethoxysilane, triisobutylmethoxysilane and tri-tert-butylmethoxysilane. Additional examples include compounds formed by changing "methoxy" contained in the above compounds to "ethoxy", "propoxy", "n-butoxy", "isobutoxy", "tert-butoxy" or "phenoxy". Preferred is a dialkyldialkoxysilane or a trialkylmonoalkoxysilane, and more preferred is a trialkylmonoalkoxysilane.

Examples of said ethers include dialkyl ethers, alkyl aryl ethers, diaryl ethers, diethers, cyclic ethers, and cyclic diethers.

Specific examples thereof include dimethyl ether, diethyl ether, di-n-propyl ether, diisopropyl ether, di-n-butyl ether, diisobutyl ether, di-tert-butyl ether, dicyclohexyl ether, diphenyl ether, methyl ethyl ether, methyl n-propyl ether, methyl isopropyl ether, methyl n-butyl ether, methyl isobutyl ether, methyl tert-butyl ether, methyl cyclohexyl ether, methyl phenyl ether, ethylene oxide, propylene oxide, oxetane, tetrahydrofuran, 2,5-dimethyltetrahydrofuran, tetrahydropyrane, 1,2-dimethoxyethane, 1,2-diethoxyethane, 1,2-diisobutoxyethane, 2,2-dimethoxypropane, 1,3-dimethoxypropane, 2,2-diisobutyl-1,3-dimethoxypropane, 2-isopropyl-2-isopentyl-1,3-dimethoxypropane, 2,2-bis(cyclohexylmethyl)-1,3-dimethoxypropane, 2-isopropyl-2-3,7-dimethyloctyl-1,3-dimethoxypropane, 2,2-diisopropyl-1,3-dimethoxypropane, 2-isopropyl-2-cyclohexylmethyl-1,3-dimethoxypropane, 2,2-dicyclohexyl-1,3-dimethoxypropane, 2-isopropyl-2-isobutyl-1,3-dimethoxypropane, 2,2-diisopropyl-1,3-dimethoxypropane, 2,2-dipropyl-1,3-dimethoxypropane, 2-isopropyl-2-cyclohexyl-1,3-dimethoxypropane, 2-isopropyl-2-cyclopentyl-1,3-dimethoxypropane, 2,2-dicyclopentyl-1,3-dimethoxypropane, 2-heptyl-2-pentyl-1,3-dimethoxypropane, 1,2-dimethoxybenzene, 1,3-dimethoxybenzene, 1,4-dimethoxybenzene, 1,3-dioxolane, 1,4-dioxane, and 1,3-dioxane.

Preferred is diethyl ether, di-n-butyl ether, methyl n-butyl ether, methyl phenyl ether, tetrahydrofuran, 1,3-dioxane, 1,4-dioxane or 1,3-dioxolan, and more preferred is diethyl ether, di-n-butyl ether or tetrahydrofuran.

Specific examples of the esters of carboxylic acids include esters of mono- or poly-carboxylic acids, and examples thereof include saturated aliphatic carboxylates, unsaturated aliphatic carboxylates, alicyclic carboxylates, and aromatic carboxylates. Specific examples thereof include methyl acetate, ethyl acetate, n-butyl acetate, isobutyl acetate, tert-butyl acetate, phenyl acetate, methyl propionate, ethyl propionate, ethyl butyrate, ethyl valerate, ethyl acrylate, methyl methacrylate, methyl benzoate, ethyl benzoate, n-butyl benzoate, isobutyl benzoate, tert-butyl benzoate, methyl toluate, ethyl toluate, methyl anisate, ethyl anisate, dimethyl succinate, diethyl succinate, di-n-butyl succinate, dimethyl malonate, diethyl malonate, di-n-butyl malonate, dimethyl maleate, dibutyl maleate, diethyl itaconate, di-n-butyl itaconate, monoethyl phthalate, dimethyl phthalate, methyl ethyl phthalate, diethyl phthalate, di-n-propyl phthalate, diisopropyl phthalate, di-n-butyl phthalate, diisobutyl phthalate, di-tert-butyl phthalate, dipentyl phthalate, di-n-hexyl phthalate, diheptyl phthalate, di-n-octyl phthalate, di(2-ethylhexyl)phthalate, diisodecyl phthalate, dicyclohexyl phthalate, diphenyl phthalate, dimethyl isophthalate, diethyl isophthalate, di-n-butyl isophthalate, diisobutyl isophthalate, di-tert-butyl isophthalate, dimethyl terephthalate, diethyl terephthalate, di-n-butyl terephthalate, diisobutyl terephthalate, and di-tert-butyl terephthalate. Preferred is methyl acetate, ethyl acetate, methyl benzoate, ethyl benzoate, dimethyl phthalate, diethyl phthalate, di-n-butyl phthalate, diisobutyl phthalate, dimethyl terephthalate, or diethyl terephthalate, and more preferred is methyl benzoate, dimethyl phthalate, diethyl phthalate, diisobutyl phthalate, or dimethyl terephthalate.

Exemplary compounds of amines include trihydrocarbylamines, and examples thereof include trimethylamine, triethylamine, tripropylamine, tri-n-butylamine, triisobutylamine, trihexylamine, trioctylamine, tirdodecylamine, and triphenylamine. Preferred is triethylamine or trioctylamine.

As the above-mentioned electron donating compound (E), compounds having an active hydrogen can be used. Among such compounds having an active hydrogen, alcohols, phenols, carboxylic acids, thiols, thiophenols, thiocarboxylic acids, sulfonic acids, ammonia, primary amines, secondary amines, anilines, imines, amides, pyrroles, pyrrolidines, piperidines, hydroxyamines, and silanols may be used. Of these, compounds having an N—H bond are preferably used, ammonia, primary amines, secondary amines, anilines, pyrrolidines, or piperidines are more preferably used, and primary amines, secondary amines, or anilines are particularly preferably used.

Specific examples of primary amines include methylamine, ethylamine, n-propylamine, isopropylamine, n-butylamine, isobutylamine, tert-butylamine, hexylamine, octylamine, and dodecylamine.

Specific examples of secondary amines include dimethylamine, diethylamine, di-n-propylamine, diisopropylamine, di-n-butylamine, diisobutylamine, di-tert-butylamine, dihexylamine, dioctylamine, didodecylamine, diphenylamine, and ethylmethylamine.

Anilines having an N—H bond can be used as said anilines, and specific examples thereof include aniline, N-methylaniline, N-ethylaniline, 4-methylaniline, and 2,6-dimethylaniline.

Pyrrolidines having an N—H bond can be used as said pyrrolidines, and specific examples thereof include pyrrolidine, 2,5-dimethylpyrrolidine, and 2,2,5,5-tetramethylpyrrolidine; piperidines having an N—H bond can be used as said piperidines, and specific examples thereof include piperidine, 4-methylpiperidine, 2,6-dimethylpiperidine, and 2,2,6,6-tetramethylpiperidine.

Among these exemplary compounds of such compounds having an active hydrogen, methylamine, ethylamine, dimethylamine, diethylamine, aniline, N-methylaniline, 2,5-dimethylpyrrolidine, or 2,6-dimethylpiperidine is used more preferably, and ethylamine, diethylamine, or N-methylaniline is used particularly preferably.

As the electron donor compound (E), an alkoxysilicon, an ether, or an amine is preferably used. Moreover, an amine is more preferably used. As to such electron donating compounds (E), only one species may be used or two or more species may be used in combination.

The method for producing the ethylene-α-olefin copolymerization catalyst of the present invention is a method for producing an ethylene-α-olefin copolymerization catalyst by bringing the aforementioned component (A), the aforementioned component (B1), the aforementioned component (B2) and the aforementioned component (C) into contact with each other, wherein the contact comprises a step of bringing the aforementioned component (B1) and the aforementioned component (B2) into contact with the aforementioned component (C) in the presence of the aforementioned component (A).

The method of bringing the above-mentioned components into contact with each other may be, for example, a method that involves bringing the components into contact with each other within a polymerization reactor by introducing them into the polymerization reactor, or a method that involves mixing the components in an inert solvent outside a polymerization reactor and bringing them into contact with each other there.

Specific examples of the inactive hydrocarbon medium to be used for the preparation of an ethylene-α-olefin copolymerization catalyst include aliphatic hydrocarbons such as propane, butane, pentane, hexane, heptane, octane, decane, dodecane, and kerosene; alicyclic hydrocarbons such as cyclopentane, cyclohexane, and methylcyclopentane; aromatic hydrocarbons such as benzene, toluene, and xylene; halogenated hydrocarbons such as ethylene chloride, chlorobenzene, and dichloromethane; and mixtures thereof.

The method for producing the ethylene-α-olefin copolymer of the present invention is to copolymerize ethylene and an α-olefin in the presence of the aforementioned ethylene-α-olefin copolymerization catalyst.

Examples of such a polymerization method include vapor phase polymerization, slurry polymerization, and bulk polymerization. Preferred is vapor phase polymerization, and more preferred is continuation vapor phase polymerization. The gas phase polymerization apparatus to be used for the polymerization method is usually an apparatus having a fluid bed type reaction vessel, preferably an apparatus having a fluid bed type reaction vessel with an enlarged part. A stirring blade may be mounted in the reaction vessel.

When ethylene and an α-olefin are vapor-polymerized, the polymerization temperature is usually lower than the temperature at which an ethylene-α-olefin copolymer is melted, preferably 0 to 150° C., and more preferably 30 to 100° C. Into a polymerization reaction vessel, an inert gas may be introduced and hydrogen may also be introduced as a molecular weight regulator. Moreover, an electron donating compound may also be introduced.

In the polymerization of ethylene and an α-olefin, it is permitted, according to need, to introduce other monomers to the polymerization reaction vessel and copolymerize the other monomers as far as the effect of the present invention is not impaired. Examples of such other monomers include conjugated dienes (e.g., butadiene and isoprene), non-conjugated dienes (e.g., 1,4-pentadiene), acrylic acid, acrylic acid esters (e.g., methyl acrylate and ethyl acrylate), methacrylic acid, methacrylic acid esters (e.g., methyl methacrylate and ethyl methacrylate), and vinyl acetate.

In the method for producing the olefin polymer of the present invention, preferred is a method in which a small amount of an olefin of component (A) is used in the preparation of an ethylene-α-olefin copolymerization catalyst and an olefin is polymerized by using, as a polymerization catalyst component or a polymerization catalyst, a prepolymerization solid catalyst component (hereinafter described as prepolymerization) obtained by bringing component (A), component (B1), component (B2), component (C), and optionally component (D) and/or component (E) into contact with each other.

Examples of the olefin to be used in the prepolymerization include ethylene, propylene, 1-butene, 1-pentene, 1-hexene, 1-octene, 4-methyl-1-pentene, cyclopentene, and cyclohexene. These may be used singly or two or more members of them may be used in combination. Preferably, only ethylene is used or ethylene is used together with an α-olefin, more preferably, only ethylene is used or ethylene is used together with at least one α-olefin selected from among 1-butene, 1-hexene, and 1-octene.

The content of a prepolymerized polymer in a prepolymerization solid catalyst component is preferably 0.01 to 1000 g, more preferably 0.05 to 500 g, even more preferably 0.1 to 200 g per gram of component (C).

The prepolymerization method may be either a continuous polymerization method or a batch polymerization method, and is, for example, a batch slurry polymerization method, a continuous slurry polymerization method, or a continuous vapor polymerization method. As a method of feeding component (A), component (B1), component (B2), component (C) and, if necessary, component (D) and/or component (E) into a polymerization reaction tank in which prepolymerization is performed, usually used is a method that involves feeding them using an inert gas such as nitrogen and argon, hydrogen, ethylene, and so on in a state containing no moisture, or a method that involves dissolving or diluting the respective components in a solvent, and feeding them in a solution or slurry state.

When the prepolymerization is performed by the slurry polymerization method, a saturated aliphatic hydrocarbon compound is usually used as a solvent and examples thereof include propane, n-butane, isobutane, n-pentane, isopentane, n-hexane, cyclohexane, and heptane. These are used singly or two or more of them are used in combination. As the saturated aliphatic hydrocarbon compound, those having a boiling point at an ordinary pressure of 100° C. or lower are preferred, those having a boiling point at an ordinary pressure of 90° C. or lower are more preferred, and propane, n-butane, isobutane, n-pentane, isopentane, n-hexane, and cyclohexane are even more preferred.

When the prepolymerization is performed by the slurry polymerization method, as for the slurry concentration, the amount of component (C) per liter of the solvent is usually 0.1 to 600 g, preferably 0.5 to 300 g. The polymerization temperature is usually −20 to 100° C., preferably 0 to 80° C.

During the prepolymerization, the polymerization temperature may be appropriately changed, and the temperature at which the prepolymerization is initiated is preferably adjusted to 45° C. or lower, more preferably to 40° C. or lower. In addition, the partial pressure of olefins in the vapor portion during the prepolymerization is usually 0.001 to 2 MPa, preferably 0.01 to 1 MPa. The prepolymerization time is usually 2 minutes to 15 hours.

As a method of feeding the prepolymerized prepolymerization solid catalyst component into a polymerization reaction tank, usually used is a method that involves feeding them using an inert gas such as nitrogen and argon, hydrogen, ethylene, and so on in a state containing no moisture, or a method that involves dissolving or diluting the respective components in a solvent, and feeding them in a solution or slurry state.

The ethylene-α-olefin copolymer of the present invention may optionally be made contain known additives. Examples of such additives include antioxidants, weathering agents, lubricants, antiblocking agents, antistatic agents, anticlouding agents, antidripping agent, pigments, and fillers.

The ethylene-α-olefin copolymer of the present invention is shaped by known processes, such as extrusion processes, e.g., tubular blown film process and flat die process, blow molding, injection molding; and compression molding. As a process, extrusion process and blow molding are preferably used, extrusion process is more preferably used, and flat die process is particularly preferably used. The ethylene-α-olefin copolymer of the present invention can be used conveniently for various foaming applications, such as electron beam crosslinking foaming, peroxide crosslinking foaming, and extrusion non-crosslinking foaming.

The ethylene-α-olefin copolymer of the present invention is used by being shaped into various forms. The form of an article is not particularly restricted, and the article is used for films, sheets, containers (e.g., trays and bottles), and so on. The article is also used suitably for utilities such as food packaging materials; medicament packaging materials; electron parts packaging materials to be used for packaging semiconductor products; and surface protective materials.

As described above, the ethylene-α-olefin copolymer of the present invention is low in extrusion load, high in melt tension, superior in take-up property when a molten copolymer is taken-up at a constant tension, superior in strain hardening property, and broad in temperature range where heat sealing can be achieved successfully.

The ethylene-α-olefin copolymer of the present invention can also be blended in a proper quantity to conventional ethylene-based polymers for the purpose of improving neck-in of ethylene-based polymers inferior in neck-in. For example, by blending the ethylene-α-olefin copolymer of the present invention in a proper quantity to an ethylene-based polymer such as a linear low density polyethylene, it is possible to greatly improve neck-in.

The ethylene-α-olefin copolymer of the present invention can also be blended in a proper quantity to conventional ethylene-based polymers for the purpose of improving the foaming characteristic of ethylene-based polymers inferior in foaming characteristic. For example, by blending the ethylene-α-olefin copolymer of the present invention in a proper quantity to an ethylene-based polymer such as a linear low density polyethylene, it is possible to greatly improve foaming characteristic.

EXAMPLES

The present invention is explained by reference to Examples and Comparative Examples below.

Physical properties in Examples and Comparative Examples were measured in accordance with the following methods.

(1) Density (d, Unit: Kg/m$^3$)

Measurement was conducted in accordance with the method provided in method A in JIS K7112-1980. Samples were subjected to the annealing disclosed in JIS K6760-1995.

(2) Melt Flow Rate (MFR, Unit: g/10 min)

Measurement was conducted by Method A under conditions represented by a load of 21.18 N and a temperature of 190° C. in accordance with the method provided in JIS K7210-1995.

(3) Swell Ratio (SR)

A strand of an ethylene-α-olefin copolymer extruded in a length of around 15 to 20 mm through an orifice under conditions including a temperature of 190° C. and a load of 21.18 N in the measurement of the melt flow rate (2) was cooled in air, thereby a solid strand was obtained. Then, the diameter D (unit: mm) of the strand at a position of about 5 mm from the extrusion upstream side tip of the strand was measured and then a value (D/D$_0$) resulting from dividing the diameter D by the orifice diameter 2.095 mm (D$_0$) was calculated, and that value was used as a swell ratio.

(4) Molecular Weight Distribution (Mw/Mn, Mz/Mw)

Using gel permeation chromatography (GPC) under the following conditions (1) through (8), a z average molecular weight (Mz), a weight average molecular weight (Mw) and a number average molecular weight (Mn) were measured, and then Mw/Mn and Mz/Mw were calculated. A straight line was defined as the baseline on the chromatogram, the straight line having been obtained by connecting a point within a stable horizontal region with retention times sufficiently shorter than the appearance of a sample elution peak and a point within a stable horizontal region with retention times sufficiently longer than the observance of a solvent elution peak. The molecular weight of a peak position of molecular weight distribution is a value determined by conversion into a polyethylene by calibration.

(1) Instrument: Waters 150 C, manufactured by Waters
    (2) Separation column: TOSOH TSKgel GMH6-HT
    (3) Measurement temperature: 140° C.
    (4) Carrier: orthodichlorobenzene
    (5) Flow rate: 1.0 mL/min
    (6) Injection amount: 500
    (7) Detector: differential refraction
    (8) Molecular weight standard substance: standard polystyrenes (5) The Number of Branches Having 5 or More Carbon Atoms (N$_{LCB}$, Unit: 1/1000 C)

By the carbon nuclear magnetic resonance method under the following measurement conditions, a carbon nuclear magnetic resonance spectrum ($^{13}$C-NMR) was measured, and the number of branches was determined by the following calculation method.

<Measurement Conditions>
    Instrument: AVANCE600 manufactured by Bruker
    Measurement solvent: mixed solvent of 1,2-dichlorobenzene/1,2-dichlorobenzene-d4=75/25 (volumetric ratio)
    Measurement temperature: 130° C.
    Measurement method: proton decoupling method
    Pulse width: 45 degrees
    Pulse repetition time: 4 seconds
    Measurement standard: trimethylsilane
    Window function: negative exponential function <Calculation Method>

When the sum total of all peaks observed at 5 to 50 ppm was taken as 1000, the peak area of a peak having a peak top at around 38.22 to 38.27 ppm was determined. The peak area of the peak was defined by the area of a signal within a range from the chemical shift of a valley between the peak and a peak existing next thereto on the higher magnetic field side to the chemical shift of a valley between the peak and a peak existing next thereto on the lower magnetic field side. In the measurement of an ethylene-1-octene copolymer under the present conditions, the position of the peak top of a peak derived from methine carbon to which a branch having 6 carbon atoms was attached was 38.21 ppm.

(6) Melt Complex Viscosity (η*, Unit: Pa·sec)

Using a viscoelasticity measuring apparatus (Rheometrics Mechanical Spectrometer RMS-800 manufactured by Rheometrics) under the following measurement conditions, a melt complex viscosity-angular frequency curve at 190° C. was measured and then a melt complex viscosity measured at an angular frequency of 100 rad/sec was determined. The lower the melt complex viscosity, the better the extrusion load in extruding process.

<Measurement Conditions>
    Geometry: parallel plates
    Plate diameter: 25 mm
    Plate distance: 1.5 to 2 mm
    Strain: 5%
    Angular frequency: 0.1 to 100 rad/sec
    Measurement atmosphere: nitrogen (7) Measurement of the Extensional Viscosity of Molten Resin Using an extensional viscosity analyzer (ARES manufactured by TA Instruments), an extensional viscosity-time curve of a molten resin at 130° C. was measured at Hencky rates of 0.1 s$^{-1}$ and 1 s$^{-1}$. As a specimen for the measurement, a sheet of 18 mm×10 mm, and 0.7 mm in thickness produced by press process was used.

(8) Melt Tension (MT, Unit: cN)

Using a melt tension tester manufactured by Toyo Seiki Seisaku-sho, Ltd., an ethylene-α-olefin copolymer was melt-extruded through an orifice of 2.095 mm in diameter and 8 mm in length at a temperature of 190° C. and an extrusion rate of 0.32 g/min, and the extruded molten ethylene-α-olefin copolymer was taken-up into a filament shape at a take-up rising rate of 6.3 (m/min)/min with a taking-up roll, and a tension applied in taking-up was measured. The maximum tension during a period from the commencement of taking-up to the breakage of the filament-shaped ethylene-α-olefin copolymer was defined as melt tension.

(9) Maximum Take-Up Velocity (MTV; Unit: m/min)

In the measurement of a melt tension of (8), the take-up velocity at the time when the filament-shaped ethylene-α- olefin copolymer broke was defined to be a maximum take-up velocity. The higher this value, the better the take-up property in extrusion process is.

(10) Characteristic Relaxation Time (τ) (sec)

Melt complex viscosity-angular frequency curves at 130° C., 150° C., 170° C., and 190° C. were measured under the following measurement conditions by using a viscoelasticity analyzer (Rheometrics Mechanical Spectrometer RMS-800 manufactured by Rheometrics), and then, from the resulting melt complex viscosity-angular frequency curves, a master curve of the melt complex viscosity-angular frequency curve at 190° C. was produced using calculation software Rhios V.4.4.4 produced by Rheometrics, thereby a characteristic relaxation time (τ) was determined.

<Measurement Conditions>
Geometry: parallel plates
Plate diameter: 25 mm
Plate distance: 1.5 to 2 mm
Strain: 5%
Angular frequency: 0.1 to 100 rad/sec
Measurement atmosphere: nitrogen Example 1

(1) Preparation of Solid Catalyst Component (S)

To a 50-liter, nitrogen-purged reactor equipped with a stirrer, 9.68 kg of silica (Sylopol 948 produced by Davison Corp; average particle diameter=55 μm; pore volume=1.67 ml/g; specific surface area=325 m²/g) thermally treated at 300° C. under a nitrogen flow as a component (b), solid state carrier was charged. After the addition of 100 liters of toluene, the resultant was cooled to 2° C. To this, 26.3 liters of a toluene solution (2.9M) of methylalumoxane was dropped over one hour. After stirring at 5° C. for 30 minutes, the resultant was heated to 95° C. over 90 minutes, followed by stirring for 4 hours. Then, after cooling to 40° C., the resultant was left at rest for 40 minutes, thereby allowing a solid component to settle, and then the top slurry portion was removed. As a washing operation, 100 liters of toluene was added thereto, followed by stirring for 10 minutes, and then the stirring was stopped and the mixture was left at rest to allow a solid component to settle, and then the top slurry portion was likewise removed. The above-described washing operation was repeated three times in total. Moreover, 100 liters of toluene was added, followed by stirring, and then the stirring was stopped and simultaneously filtration was carried out. This operation was repeated once again, and then 110 liters of hexane was added and filtration was carried out in the same way. This operation was repeated once again. Then, drying was carried out at 70° C. for 7 hours under a nitrogen flow, thereby 12.6 kg of a solid catalyst component was obtained. Elemental analysis revealed that Al=4.4 mmol/g.

(2) Polymerization

An autoclave having an internal volume of 3 liters and equipped with a stirrer, the autoclave having been purged with argon after drying under reduced pressure, was evacuated, and then 180 ml of 1-hexene and 650 g of butane as a polymerization solvent were fed, and the temperature was raised to 70° C. Thereafter, ethylene was added so that its partial pressure might become 1.6 MPa, and the system was stabilized. Into this, 0.9 ml of a hexane solution of triisobutylaluminum as an organoaluminum compound (C), the concentration of which had been adjusted to 1 mol/l, was fed. Then, 3.125 ml of a toluene solution of dimethylsilanediylbis(cyclopentadienyl)zirconium dichloride [corresponding to transition metal compound (B1)], the concentration of which had been adjusted to 2 μmol/ml, and 0.5 ml of a toluene solution of diphenylmethylene (cyclopentadienyl)(9-fluorenyl)zirconium dichloride [corresponding to transition metal compound (B2)], the concentration of which had been adjusted to 1 μmol/ml, were fed and, subsequently 104.6 mg of the solid catalyst component (S) obtained in the above (1) was fed therein. During polymerization, while ethylene was supplied continuously, polymerization was performed at 70° C. for 60 minutes. Then, butane, and ethylene were purged, thereby 43 g of an ethylene-1-hexene copolymer was obtained.

Physical properties of the resulting copolymer are shown in Table 1.

Example 2

(1) Polymerization

An autoclave having an internal volume of 3 liters and equipped with a stirrer, the autoclave having been purged with argon after drying under reduced pressure, was evacuated, hydrogen was added so that its partial pressure might become 0.0025 MPa, and then 180 ml of 1-hexene and 650 g of butane as a polymerization solvent were fed, and the temperature was raised to 70° C. Thereafter, ethylene was added so that its partial pressure might become 1.6 MPa, and the system was stabilized. Into this, 0.9 ml of a hexane solution of triisobutylaluminum as an organoaluminum compound (C), the concentration of which had been adjusted to 1 mol/l, was fed. Then, 6.25 ml of a toluene solution of dimethylsilanediylbis (cyclopentadienyl)zirconium dichloride [corresponding to transition metal compound (B1)], the concentration of which had been adjusted to 2 μmol/ml, and 1 ml of a toluene solution of diphenylmethylene (cyclopentadienyl)(9-fluorenyl)zirconium dichloride [corresponding to transition metal compound (B2)], the concentration of which had been adjusted to 1 mmol/ml, were fed and, subsequently 210.8 mg of the solid catalyst component obtained in Example 1(1) was fed therein. During polymerization, while ethylene gas was supplied continuously, polymerization was performed at 70° C. for 60 minutes. Then, butane, and ethylene were purged, thereby 86 g of an ethylene-1-hexene copolymer was obtained. Physical properties of the resulting copolymer are shown in Table 1.

Example 3

(1) Polymerization

An autoclave having an internal volume of 3 liters and equipped with a stirrer, the autoclave having been purged with argon after drying under reduced pressure, was evacuated, hydrogen was added so that its partial pressure might become 0.005 MPa, and then 180 ml of 1-hexene and 650 g of butane as a polymerization solvent were fed, and the temperature was raised to 70° C. Thereafter, ethylene was added so that its partial pressure might become 1.6 MPa, and the system was stabilized. Into this, 0.9 ml of a hexane solution of triisobutylaluminum as an organoaluminum compound (C), the concentration of which had been adjusted to 1 mol/l, was fed. Then, 6.25 ml of a toluene solution of dimethylsilanediylbis (cyclopentadienyl)zirconium dichloride [corresponding to transition metal compound (B1)], the concentration of which had been adjusted to 2 μmol/ml, and 1.0 ml of a toluene solution of diphenylmethylene (cyclopentadienyl)(9-fluorenyl)zirconium dichloride [corresponding to transition metal compound (B2)], the concentration of which had been adjusted to 1 μmol/ml, were fed and, subsequently 105.8 mg of the solid catalyst component (S) obtained in Example 1(1) was fed therein. During polymerization, while an ethylene/hydrogen mixed gas (hydrogen=0.043 mol %) was supplied continuously, polymerization was performed at 70° C. for 90 minutes. Then, butane, ethylene, and hydrogen were purged, thereby 42 g of an ethylene-1-hexene copolymer was obtained. Physical properties of the resulting copolymer are shown in Table 1.

Example 4

(1) Polymerization

An autoclave having an internal volume of 3 liters and equipped with a stirrer, the autoclave having been purged with argon after drying under reduced pressure, was evacuated, and then 180 ml of 1-hexene and 650 g of butane as a polymerization solvent were fed, and the temperature was raised to 70° C. Thereafter, ethylene was added so that its partial pressure might become 1.6 MPa, and the system was stabilized. Into this, 0.9 ml of a hexane solution of triisobutylaluminum as an organoaluminum compound (C), the concentration of which had been adjusted to 1 mol/l, was fed. Then, 3 ml of a toluene solution of dimethylsilanediylbis(cyclopentadienyl)zirconium dichloride [corresponding to transition metal compound (B1)], the concentration of which had been adjusted to 2 μmol/ml, and 0.1 ml of a toluene solution of diphenylmethylene (cyclopentadienyl)(9-fluorenyl)zirconium dichloride [corresponding to transition metal compound (B2)], the concentration of which had been adjusted to 1 μmol/ml, were fed and, subsequently 91.1 mg of the solid catalyst component obtained in Example 1(1) was fed therein. During polymerization, while ethylene gas was supplied continuously, polymerization was performed at 70° C. for 60 minutes. Then, butane, and ethylene were purged, thereby 34 g of an ethylene-1-hexene copolymer was obtained. Physical properties of the resulting copolymer are shown in Table 1.

Example 5

(1) Polymerization

An autoclave having an internal volume of 3 liters and equipped with a stirrer, the autoclave having been purged with argon after drying under reduced pressure, was evacuated, and then 180 ml of 1-hexene and 650 g of butane as a polymerization solvent were fed, and the temperature was raised to 70° C. Thereafter, ethylene was added so that its partial pressure might become 1.6 MPa, and the system was stabilized. Into this, 0.9 ml of a hexane solution of triisobutylaluminum as an organoaluminum compound (C), the concentration of which had been adjusted to 1 mol/l, was fed. Then, 5 ml of a toluene solution of dimethylsilanediylbis(cyclopentadienyl)zirconium dichloride [corresponding to transition metal compound (B1)], the concentration of which had been adjusted to 2 μmol/ml, and 0.25 ml of a toluene solution of diphenylmethylene(cyclopentadienyl)(9-fluorenyl)zirconium dichloride [corresponding to transition metal compound (B2)], the concentration of which had been adjusted to 1 μmol/ml, were fed and, subsequently 207.8 mg of the solid catalyst component obtained in Example 1(1) was fed therein. During polymerization, while ethylene gas was supplied continuously, polymerization was performed at 70° C. for 60 minutes. Then, butane, and ethylene were purged, thereby 77 g of an ethylene-1-hexene copolymer was obtained.

Physical properties of the resulting copolymer are shown in Table 1.

Example 6

(1) Polymerization

An autoclave having an internal volume of 3 liters and equipped with a stirrer, the autoclave having been purged with argon after drying under reduced pressure, was evacuated, and then 180 ml of 1-hexene and 650 g of butane as a polymerization solvent were fed, and the temperature was raised to 70° C. Thereafter, ethylene was added so that its partial pressure might become 1.6 MPa, and the system was stabilized. Into this, 0.9 ml of a hexane solution of triisobutylaluminum as an organoaluminum compound (C), the concentration of which had been adjusted to 1 mol/l, was fed. Then, 5 ml of a toluene solution of dimethylsilanediylbis(cyclopentadienyl)zirconium dichloride [corresponding to transition metal compound (B1)], the concentration of which had been adjusted to 2 μmol/ml, and 0.5 ml of a toluene solution of diphenylmethylene (cyclopentadienyl)(9-fluorenyl)zirconium dichloride [corresponding to transition metal compound (B2)], the concentration of which had been adjusted to 1 μmol/ml, were fed and, subsequently 209 mg of the solid catalyst component obtained in Example 1(1) was fed therein.

During polymerization, while ethylene gas was supplied continuously, polymerization was performed at 70° C. for 60 minutes. Then, butane, and ethylene were purged, thereby 82 g of an ethylene-1-hexene copolymer was obtained. Physical properties of the resulting copolymer are shown in Table 1.

Comparative Example 1

(1) Preparation of Slurry State Catalyst Component (Cat-1)

Into 100 ml of a nitrogen-purged glass pear-shaped flask was fed 200 mg of the slurry state catalyst component (S) prepared in Example 1(1). Then, 12.5 ml of a toluene solution of dimethylsilanediylbis(cyclopentadienyl)zirconium dichloride [corresponding to transition metal compound (B1)], the concentration of which had been adjusted to 2 μmol/ml, and 1 ml of a toluene solution of diphenylmethylene (cyclopentadienyl)(9-fluorenyl)zirconium dichloride [corresponding to transition metal compound (B2)], the concentration of which had been adjusted to 2 μmol/ml, were fed and, a reaction was carried out at room temperature for 5 minutes under stirring. Thereafter, after the supernatant was removed by decantation, the resultant was washed with hexane twice to afford 6 ml of a hexane slurry.

(2) Polymerization

An autoclave having an internal volume of 3 liters and equipped with a stirrer, the autoclave having been purged with argon after drying under reduced pressure, was evacuated, and then 180 ml of 1-hexene and 650 g of butane as a polymerization solvent were fed, and the temperature was raised to 70° C. Thereafter, an ethylene/hydrogen mixed gas (hydrogen=0.33 mol %) was added so that a partial pressure of the mixed gas might become 1.6 MPa, and the system was stabilized. Gas chromatography analysis found that the gas composition in the system was hydrogen=0.15 mol %. Into this, 0.9 ml of a hexane solution of triisobutylaluminum as an organoaluminum compound (C), the concentration of which had been adjusted to 1 mol/l, was fed. Then, 6 ml of the slurry state catalyst component (Cat-1) prepared in the above (2) was fed. During polymerization, while ethylene/hydrogen mixed gas (hydrogen=0.33 mol %) was supplied continuously, polymerization was performed at 70° C. for 60 minutes. Then, butane, ethylene, and hydrogen were purged, thereby 71 g of an ethylene-1-hexene copolymer was obtained. Physical properties of the resulting copolymer are shown in Table 2.

Comparative Example 2

(1) Preparation of Solid Catalyst Component

Into a reactor equipped with a stirrer and purged with nitrogen were charged 2.8 kg of silica heat treated at 300° C. under a nitrogen flow (Sylopol 948 produced by Davison Co., Ltd.; 50% volume average particle diameter=55 μm; pore volume=1.67 ml/g; specific surface area=325 m²/g) and 24 kg of toluene, which were then stirred. Then, after cooling the reactor to 5° C., a mixed solution of 0.9 kg of 1,1,1,3,3,3-hexamethyldisilazane and 1.4 kg of toluene was dropped over 30 minutes with the temperature of the reactor kept at 5° C. After the completion of the dropping, the mixture was stirred at 5° C. for 1 hour, then the temperature was raised to 95° C., and this was stirred at 95° C. for 3 hours, and filtered. Then, the resulting solid product was washed with 20.8 kg of toluene six times. Thereafter, 7.1 kg of toluene was added to form a slurry, which was then allowed to stand overnight.

Into the slurry obtained above were fed 1.73 kg of a hexane solution of diethylzinc (diethylzinc concentration: 50% by weight) and 1.02 kg of hexane, and the resultant was stirred. Then, after cooling to 5° C., a mixed solution of 0.78 kg of 3,4,5-trifluorophenol and 1.44 kg of toluene was dropped over 60 minutes with the temperature of the reactor kept at 5° C. After the completion of the dropping, the mixture was stirred at 5° C. for 1 hour, then the temperature was raised to 40° C., and this was stirred at 40° C. for 1 hour. Thereafter, the mixture was cooled to 22° C., and 0.11 kg of $H_2O$ was dropped over 1.5 hours while the temperature of the reactor was kept at 22° C. After the completion of the dropping, the mixture was stirred at 22° C. for 1.5 hours, then, the temperature was raised to 40° C., the mixture was stirred at 40° C. for 2 hours, further, the temperature was raised to 80° C., and the mixture was stirred at 80° C. for 2 hours. After the stirring, at room temperature, the supernatant was extracted to a remaining amount of 16 L, 11.6 kg of toluene was fed therein, then the temperature was raised to 95° C., and the mixture was stirred for 4 hours.

After stirring, at room temperature, the supernatant was extracted, thereby a solid product was obtained. The resulting solid product was washed with 20.8 kg of toluene four times and with 24 liters of hexane three times. Subsequent drying afforded a solid catalyst constituent.

(2) Polymerization

An autoclave having an internal volume of 3 liters and equipped with a stirrer, the autoclave having been purged with argon after drying under reduced pressure, was evacuated, hydrogen was added so that its partial pressure might become 0.025 MPa, and then 180 ml of 1-hexene and 650 g of butane as a polymerization solvent were fed, and the temperature was raised to 70° C. Thereafter, ethylene was added so that its partial pressure might become 1.6 MPa, and the system was stabilized. Gas chromatography analysis found that the gas composition in the system was hydrogen=1.56 mol %. Into this, 0.9 ml of a hexane solution of triisobutylaluminum as an organoaluminum compound (C), the concentration of which had been adjusted to 1 mol/l, was fed. Then, 0.2 ml of a toluene solution of racemic ethylenebis(1-indenyl)zirconium diphenoxide, the concentration of which had been adjusted to 2 μmol/ml, and 0.3 ml of a toluene solution of diphenylmethylene(cyclopentadienyl)(9-fluorenyl)zirconium dichloride [corresponding to transition metal compound (B2)], the concentration of which had been adjusted to 0.1 μmol/ml, were fed and, subsequently 18.8 mg of the solid catalyst component obtained in Comparative Example 2(1) was fed therein. During polymerization, while ethylene/hydrogen mixed gas (hydrogen=0.22 mol %) was supplied continuously, polymerization was performed at 70° C. for 180 minutes. Then, butane, ethylene, and hydrogen were purged, thereby 179 g of an ethylene-1-hexene copolymer was obtained. The results of the physical property evaluation of the resulting polymer are shown in Table 2.

TABLE 1

|  |  | Example 1 | Example 2 | Example 3 | Example 4 | Example 5 | Example 6 |
|---|---|---|---|---|---|---|---|
| Density | kg/m³ | 922 | 924 | 926 | 926 | 925 | 923 |
| MFR | g/10 min | 0.9 | 5.2 | 12.9 | 17.3 | 9.2 | 1.5 |
| SR | — | 1.80 | 2.59 | 2.96 | 3.04 | 2.72 | 2.02 |
| Molecular weight distribution | — |  |  |  |  |  |  |
| Mw/Mn |  | 10.1 | 17.5 | 11.5 | 9.7 | 14.8 | 16.0 |
| Mz/Mw |  | 7.9 | 13.8 | 10.6 | 11.9 | 11.2 | 10.8 |
| H | % | 23 | 21 | 18 | 12 | 16 | 21 |
| Molecular weight at a peak position | 10³ | 14.9 | 14.9 | 13.7 | 16.0 | 14.9 | 14.4 |
| The number of DSC melting peaks | — | 2 | 2 | 2 | 2 | 2 | 2 |
| $N_{LCB}$ | 1/1000C | 0.16 | 0.12 | 0.08 | 0.10 | 0.18 | 0.25 |
| Melt complex viscosity | Pa · sec | 266 | 143 | 111 | 92 | 116 | 225 |
| k | — | 0.68 | 1.23 | 1.35 | 1.37 | 1.43 | 1.27 |
| k1/k2 | — | 0.81 | 0.96 | 1.04 | 1.01 | 1.01 | 0.99 |
| Melt tension | cN | 19.6 | 14.7 | 7.8 | 12.7 | 12.5 | 21 |
| Maximum take-up velocity | m/min | 3.5 | 4.3 | 6.8 | 8.5 | 7.0 | 2.8 |
| Left side of formula (1) | — | 43 | 15 | 9 | 7 | 10 | 31 |

TABLE 1-continued

|  | | Example 1 | Example 2 | Example 3 | Example 4 | Example 5 | Example 6 |
|---|---|---|---|---|---|---|---|
| Right side of formula (1) | — | | 73 | 54 | 46 | 44 | 49 | 67 |
| Relaxation time τ | s | | 56 | 42 | 35 | 10 | 15 | 50 |

TABLE 2

| | | Comparative Example 1 | Comparative Example 2 |
|---|---|---|---|
| Density | kg/m³ | 920 | 919 |
| MFR | g/10 min | 3.0 | 1.8 |
| SR | — | 2.48 | 1.97 |
| Molecular weight distribution | — | | |
| Mw/Mn | | 11.0 | 6.8 |
| Mz/Mw | | 6.9 | 3.1 |
| H | % | 29 | 66 |
| Molecular weight at a peak position | 10³ | 15.8 | 39.1 |
| The number of DSC melting peaks | — | 2 | 1 |
| $N_{LCB}$ | 1/1000C | 0 | 0.08 |
| Melt complex viscosity | Pa · sec | 244 | 554 |
| k | — | 1.04 | —* |
| k1/k2 | — | 0.70 | —* |
| Melt tension | cN | 15.4 | 8.7 |
| Maximum take-up velocity | m/min | 1.5 | 9.2 |
| Left side of formula (1) | | 21 | 28 |
| Right side of formula (1) | | 59 | 65 |
| Relaxation time τ | s | 16 | 4 |

*When measured at a Henckey rate of 1 s⁻¹, the elongated resin was broken before 2.5 seconds from elongation initiation.

INDUSTRIAL APPLICABILITY

By the present invention, there can be provided an ethylene-α-olefin copolymer that is low in extrusion load, high in melt tension, superior in take-up property in taking-up a molten copolymer at a fixed tension, superior in strain hardening characteristics, and superior in secondary processability, and an article obtained by extruding the copolymer.

The invention claimed is:

1. An ethylene-α-olefin copolymer comprising monomer units derived from ethylene and monomer units derived from an α-olefin having 3 to 20 carbon atoms, wherein the ethylene-α-olefin copolymer has a density (d) of 860 to 950 kg/m³ and a melt flow rate (MFR) of 0.01 to 100 g/10 min, wherein in a molecular weight curve measured by gel permeation chromatography (GPC), a molecular weight of the copolymer providing the highest peak exists within the range of 10,000 to 20,000, wherein a height of the peak at a molecular weight of 177,000 is 5 to 30% where the height of the highest peak is 100%, wherein a characteristic relaxation time (τ) of the copolymer satisfies a relationship represented by formula (I), and wherein the ethylene-α-olefin copolymer exhibits more than one melt peak observed by a differential scanning calorimeter (DSC)

$$40.2 \times MFR^{-0.606} < \tau < 71.8 \times MFR^{0.175} \quad (1).$$

2. An ethylene-α-olefin copolymer comprising monomer units derived from ethylene and monomer units derived from an α-olefin having 3 to 20 carbon atoms, wherein the ethylene-α-olefin copolymer has a density (d) of 860 to 950 kg/m³ and a melt flow rate (MFR) of 0.01 to 100 g/10 min, wherein in a molecular weight curve measured by gel permeation chromatography (GPC), a molecular weight of the copolymer providing the highest peak exists within the range of 10,000 to 20,000, wherein a height of the peak at a molecular weight of 177,000 is 5 to 30% where the height of the highest peak is 100%, wherein a number ($N_{LCB}$) of branches having 5 or more carbon atoms measured by nuclear magnetic resonance (NMR) is 0.1 or more, and wherein the ethylene-α-olefin copolymer exhibits more than one melt peak observed by a differential scanning calorimeter (DSC).

3. An article obtained by extruding the ethylene-α-olefin copolymer according to claim 1.

4. An article obtained by extruding the ethylene-α-olefin copolymer according to claim 2.

* * * * *